United States Patent
Kawakami et al.

(10) Patent No.: US 7,651,630 B2
(45) Date of Patent: *Jan. 26, 2010

(54) DIFLUOROBENZENE DERIVATIVE AND NEMATIC LIQUID CRYSTAL COMPOSITION USING THE SAME

(75) Inventors: Shotaro Kawakami, Kumagaya (JP); Takashi Matsumoto, Kitaadachi-gun (JP); Tetsuo Kusumoto, Ageo (JP); Yoshitaka Saito, Iwatsuki (JP); Yutaka Nagashima, Saitama (JP); Makoto Negishi, Saitama (JP); Masayuki Iwakubo, Kitaadachi-gun (JP)

(73) Assignee: Dainippon Ink and Chemicals, Inc., Tokyo (JP)

(*) Notice: Subject to any disclaimer, the term of this patent is extended or adjusted under 35 U.S.C. 154(b) by 143 days.

This patent is subject to a terminal disclaimer.

(21) Appl. No.: 11/817,203

(22) PCT Filed: Feb. 27, 2006

(86) PCT No.: PCT/JP2006/303641

§ 371 (c)(1),
(2), (4) Date: Aug. 27, 2007

(87) PCT Pub. No.: WO2006/093102

PCT Pub. Date: Sep. 8, 2006

(65) Prior Publication Data

US 2009/0050843 A1    Feb. 26, 2009

(30) Foreign Application Priority Data

| Feb. 28, 2005 | (JP) | 2005-053112 |
| Mar. 29, 2005 | (JP) | 2005-094469 |
| Mar. 29, 2005 | (JP) | 2005-094470 |
| Jun. 30, 2005 | (JP) | 2005-191842 |

(51) Int. Cl.
C09K 19/00 (2006.01)
C09K 19/06 (2006.01)
C09K 19/52 (2006.01)

(52) U.S. Cl. ............... 252/299.6; 252/299.01; 252/299.63; 430/20; 430/270.1; 428/1.1

(58) Field of Classification Search ............ 252/299.01, 252/299.6, 299.63; 428/1.1; 430/20, 270.1
See application file for complete search history.

(56) References Cited

U.S. PATENT DOCUMENTS

| 4,637,897 | A | 1/1987 | Kelly |
| 5,236,620 | A | 8/1993 | Reiffenrath et al. |
| 5,248,447 | A | 9/1993 | Reiffenrath et al. |
| 5,279,764 | A | 1/1994 | Reiffenrath et al. |
| 5,384,065 | A | 1/1995 | Geelhaar et al. |
| 5,599,480 | A | 2/1997 | Tarumi et al. |
| 6,190,576 | B1 | 2/2001 | Andou et al. |
| 6,376,030 | B1 | 4/2002 | Hecmeier et al. |
| 7,081,279 | B2 | 7/2006 | Kato et al. |
| 2008/0111107 | A1* | 5/2008 | Kawakami et al. ..... 252/299.63 |

FOREIGN PATENT DOCUMENTS

| DE | 3906058 | 9/1989 |
| EP | 0474062 A2 | 3/1992 |
| EP | 0 916 639 A1 | 5/1999 |
| EP | 0 969 071 A1 | 1/2000 |
| EP | 1 835 009 A1 | 9/2007 |
| JP | 60199840 A | 10/1985 |
| JP | 24725 A | 1/1990 |
| JP | 2503436 A | 10/1990 |
| JP | 2503568 A | 10/1990 |
| JP | 8104869 A | 4/1996 |
| JP | 10120600 A | 5/1998 |
| JP | 11106357 A | 4/1999 |
| JP | 11241068 A | 9/1999 |
| JP | 200053602 A | 2/2000 |
| JP | 200096055 A | 4/2000 |
| JP | 200139906 A | 2/2001 |
| WO | 8908632 A1 | 9/1989 |
| WO | WO 89/08689 | 9/1989 |
| WO | 9736847 A1 | 10/1997 |

OTHER PUBLICATIONS

Numata Hiroshi; Monthly Display, vol. 4, No. 3, pp. 1-7 (1998) (p. 5, Table 4).
International Search Report of PCT/JP2006/303641, date of mailing May 23, 2006.
Extended European Search Report dated Feb. 26, 2009, issued in corresponding European Patent Application No. 06714778.

* cited by examiner

*Primary Examiner*—Geraldina Visconti
(74) *Attorney, Agent, or Firm*—Westerman, Hattori, Daniels & Adrian, LLP

(57) ABSTRACT

A nematic liquid crystal composition of the present invention includes 10 to 80% by mass of either one or at least two compounds represented by general formula (I) as a first component; and 20 to 70% by mass of either one or at least two compounds represented by general formula (II) as a second component, wherein a dielectric constant anisotropy is negative.

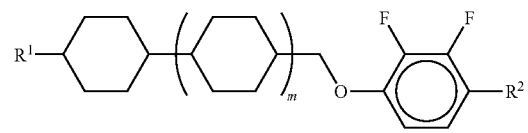

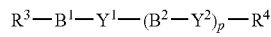

The use of this nematic liquid crystal composition can provide a highly reliable liquid crystal display element capable of maintaining a high voltage-holding ratio even in a high temperature region, and achieving quick responsiveness without reducing the cell gap.

16 Claims, No Drawings

DIFLUOROBENZENE DERIVATIVE AND NEMATIC LIQUID CRYSTAL COMPOSITION USING THE SAME

TECHNICAL FIELD

The present invention relates to a nematic liquid crystal composition having a negative dielectric constant anisotropy Δ∈ which is useful as an electrooptic liquid crystal display material, and a liquid crystal display element using the same.

BACKGROUND ART

Liquid crystal display elements have been used for various electrical household machineries and equipment such as a clock and a calculator, measuring equipments, panels for automobile, word processors, electronic notes, printers, computers, televisions, and the like. Typical liquid crystal display systems include TN (twisted nematic) type, STN (super twisted nematic) type, DS (dynamic light scattering) type, GH (guest-host) type, IPS (in-plane switching) type, OCB (optically compensated bend) type, ECB (electrically controlled birefringence) type, VA (vertical alignment) type, CSH (color super homeotropic) type, FLC (ferroelectric liquid crystal), and the like. Moreover, regarding a driving system, multiplex driving system has become typical from conventional static driving system, and simple matrix systems and recently active matrix (hereunder, referred to as "AM") systems in which driving is performed by TFT (thin film transistor), TFD (thin film diode), and the like, have been in the mainstream.

In these display systems, IPS type, ECB type, VA type, CSH type, and the like are different from TN type and STN type which are currently used for general purpose, and are characterized in that liquid crystal materials having a negative dielectric constant anisotropy (Δ∈) are used. Of these, in particular, VA type display by means of AM driving is the most expected type at present in the application to display elements that require high-speed and wide-field angle, such as a television.

For liquid crystal materials used for display systems such as VA type, a low-voltage driving property, quick responsiveness, and a wide operating temperature range are required. That is, a negative dielectric constant anisotropy of a large absolute value, a low viscosity, and a high nematic phase-isotropic liquid phase transition temperature (Tni) are required. Therefore, in order to realize quick responsiveness, an attempt has been made to reduce the cell gap of display elements. However, in order to optimally set the retardation represented by the product (Δn×d) of the refractive index anisotropy (Δn) and the cell gap (d), the refractive index anisotropy and the cell gap of a liquid crystal material have to be adjusted within appropriate ranges. Accordingly, narrowing of the cell gap has been limited. In order to improve the response speed without changing the cell gap, it is effective to use a liquid crystal composition with a low viscosity. If a liquid crystal display element is applied to a television or the like, since quick responsiveness is prioritized, the development of liquid crystal compositions having a low viscosity has been particularly in demand.

As a liquid crystal material having a negative dielectric constant anisotropy, liquid crystal compounds having a 2,3-difluorophenylene structure as follows are disclosed (refer to Patent Documents 1 and 2).

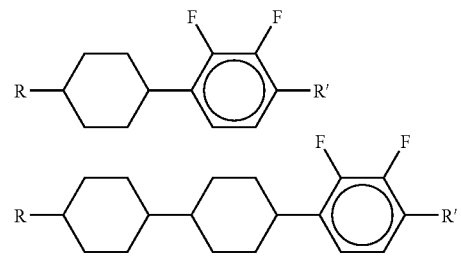

(wherein R and R' represent an alkyl group or an alkoxy group of 1 to 10 carbon atoms).

Furthermore, in these cited documents, compounds having a 1-hydroxy-2,3-difluoro-4-substituted benzene structure are disclosed. However, the compounds described in the cited documents are comprehensive in a wide range, and there is no specific disclosure of a compound having alkenyl groups at the both side chains. With liquid crystal compositions having a negative dielectric constant anisotropy using the described compounds, a sufficiently low viscosity has not been realized yet in liquid crystal compositions in which quick responsiveness is required for a liquid crystal television or the like.

On the other hand, there are disclosures of liquid crystal compositions using compounds having a 1-hydroxy-2,3-difluoro-4-substituted benzene structure serving as a basic structure of a liquid crystal compound constituting the invention of the present invention (refer to Patent Documents 3, 4, and 5). However there is no specific disclosure of a liquid crystal composition using a compound having alkenyl groups at the both side chains, and there is no specific disclosure of the type of compound to be used in addition to the concerned compound so as to reduce the viscosity of the liquid crystal composition.

Moreover, liquid crystal compounds having a 2,3-difluorohydroquinone structure have been already disclosed (refer to Patent Documents 6 and 7), and liquid crystal compositions using the concerned compound have been also disclosed. However, the concerned compound has a hydroquinone structure, and thus is considered to be unusable for an active matrix in the point of the voltage-holding ratio (refer to Non Patent Document 1), delaying the development of a liquid crystal composition having a low viscosity for VA using the concerned compound.

Accordingly, the development of a liquid crystal composition having a negative dielectric constant anisotropy with a low viscosity is desired.

[Patent Document 1] Japanese Unexamined Patent Application, First Publication No. S60-199840

[Patent Document 2] Japanese Unexamined Patent Application, First Publication No. H2-4725

[Patent Document 3] Japanese Unexamined Patent Application, First Publication No. H8-104869

[Patent Document 4] Japanese Unexamined Patent Application, First Publication No. 2000-96055

[Patent Document 5] European Patent Application, Publication No. 0474062 (page 14)

[Patent Document 6] Published Japanese Translation No. H2-503568 of the PCT International Publication

[Patent Document 7] German Patent Application, Publication No. 3906058

[Non Patent Document 1] Hiroshi Numata, Monthly Display, Vol. 4, No. 3, pp, 1-7, (1998) (page 5, Table 4)

DISCLOSURE OF THE INVENTION

A problem to be solved by the present invention is to provide a nematic liquid crystal composition having a negative dielectric constant anisotropy of a large absolute value and a low viscosity with decreasing or without increasing the refractive index anisotropy, and to provide a liquid crystal display element of VA type or the like using the same.

As a result of earnest investigation to solve the above problems, the present invention described as follows has been completed.

That is, the present invention provides a nematic liquid crystal composition, including:

10 to 80% by mass of either one or at least two compounds represented by general formula (I) as a first component:

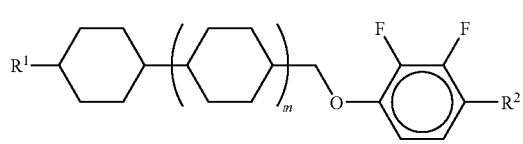

(I)

(wherein $R^1$ represents an alkenyl group of 2 to 10 carbon atoms, in which one $CH_2$ group, or at least two $CH_2$ groups that are not adjacent, may be substituted with O and/or S, and one or at least two hydrogen atoms may be substituted with F or Cl; $R^2$ represents an alkenyl group of 2 to 10 carbon atoms or an alkenyloxy group of 3 to 10 carbon atoms; and m represents 0, 1, or 2); and 20 to 70% by mass of either one or at least two compounds represented by general formula (II) as a second component:

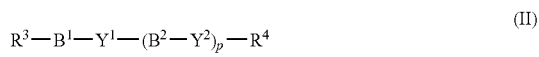

(II)

(wherein $R^3$ and $R^4$ each represent, independently, an alkyl group of 1 to 10 carbon atoms, an alkoxy group of 1 to 10 carbon atoms, an alkenyl group of 2 to 10 carbon atoms, or an alkenyloxy group of 3 to 10 carbon atoms;

$B^1$ and $B^2$ each represent, independently, a group selected from the group consisting of (a) a trans-1,4-cyclohexylene group (in which one $CH_2$ group, or at least two $CH_2$ groups that are not adjacent, may be substituted with an oxygen atom or a sulfur atom), (b) a 1,4-phenylene group (in which one or at least two CH groups may be substituted with a nitrogen atom), and (c) a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, and a 1,2,3,4-tetrahydronaphthalene-2,6-diyl group, in which the above group (a), group (b) or group (c) may be substituted with CN or halogen;

$Y^1$ and $Y^2$ each represent, independently, —$CH_2CH_2$—, —CH=CH—, —$CH(CH_3)CH_2$—, —$CH_2CH(CH_3)$—, —$CH(CH_3)CH(CH_3)$—, —$CF_2CF_2$—, —CF=CF—, —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —C≡C—, —$CF_2O$—, —$OCF_2$—, —COO—, —OCO—, —COS—, —SCO—, or a single bond;

in the case where pluralities of $Y^2$ and $B^2$ exist, a plurality of $Y^2$ or $B^2$ may be the same or different; and p represents 0, 1, or 2), wherein a dielectric constant anisotropy is negative. Also, the present invention provides a liquid crystal display element using the concerned nematic liquid crystal composition.

The total of the content ratios of the first component and the second component does not exceed 100% by mass.

Furthermore, the present invention provides a difluorobenzene derivative represented by general formula (1):

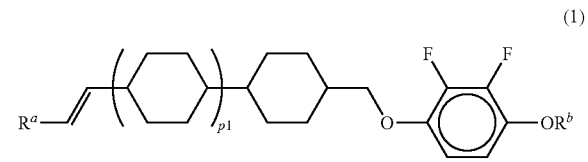

(1)

(wherein $R^a$ represents a hydrogen atom or a linear alkyl group of 1 to 3 carbon atoms, $R^b$ represents an alkenyl group of 3 to 7 carbon atoms, and p1 represents 0, 1, or 2).

Due to the combination of liquid crystal compounds of the present invention, a nematic liquid crystal composition having a negative dielectric constant anisotropy with a low viscosity can be obtained while substantially maintaining the refractive index anisotropy. The use of this nematic liquid crystal composition can provide a highly reliable liquid crystal display element capable of maintaining a high voltage-holding ratio even in a high temperature region, and achieving quick responsiveness without reducing the cell gap. This liquid crystal display element is very useful as a liquid crystal display of VA type, ECB type, IPS type, or the like.

BEST MODE FOR CARRYING OUT THE INVENTION

The nematic liquid crystal composition in the present invention includes either one or at least two compounds represented by general formula (I) as a first component. However the number of the compounds is preferably 1 to 20, more preferably 1 to 15, yet more preferably 1 to 10, and particularly preferably 1 to 8.

Compounds represented by general formula (I) have a negative dielectric constant anisotropy of a large absolute value. However, if the amount of content is large, the viscosity tends to be increased, or the smectic-nematic phase transition temperature may be increased. Therefore, the content ratio thereof is preferably low when the low viscosity is prioritized, or when the low smectic-nematic phase transition temperature is prioritized, and the content ratio thereof is preferably high when the negative dielectric constant anisotropy of a large absolute value is prioritized.

In general formula (I), $R^1$ represents an alkenyl group of 2 to 10 carbon atoms, preferably an alkenyl group of 2 to 7 carbon atoms, and particularly preferably the following specific structures (1) to (5):

-continued

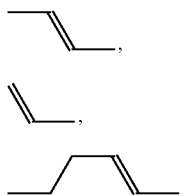

(The right terminal of the above structural formulas is connected to the ring).

On the other hand, $R^2$ represents an alkenyl group of 2 to 10 carbon atoms or an alkenyloxy group of 3 to 10 carbon atoms, and more preferably an alkenyl group of 2 to 7 carbon atoms or an alkenyloxy group of 3 to 7 carbon atoms.

In more detail, preferably the general formula (I) represents a compound represented by the following general formula (I-A) and general formula (I-B) as a specific structure:

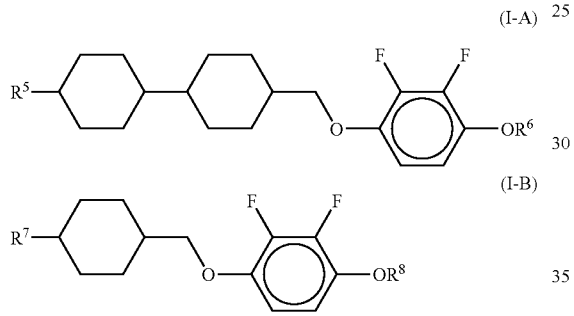

(wherein $R^5$ and $R^7$ each represent, independently, an alkenyl group of 2 to 10 carbon atoms, and $R^6$ and $R^8$ each represent, independently, an alkenyl group of 3 to 10 carbon atoms).

More preferably, the general formula (I) represents a compound represented by the group consisting of general formulas (I-A-I) through (1-A-IV) and general formulas (I-B-I) through (I-B-IV):

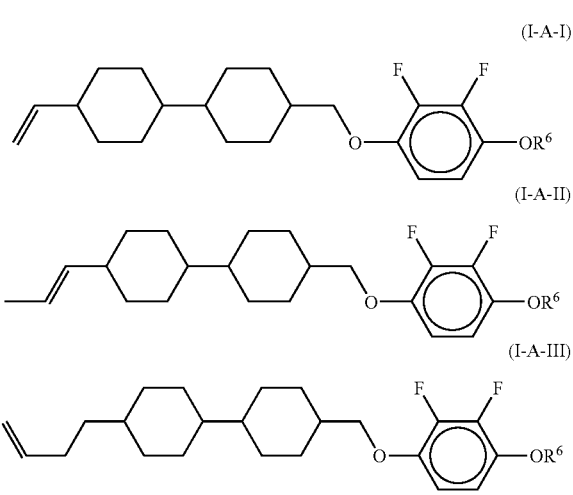

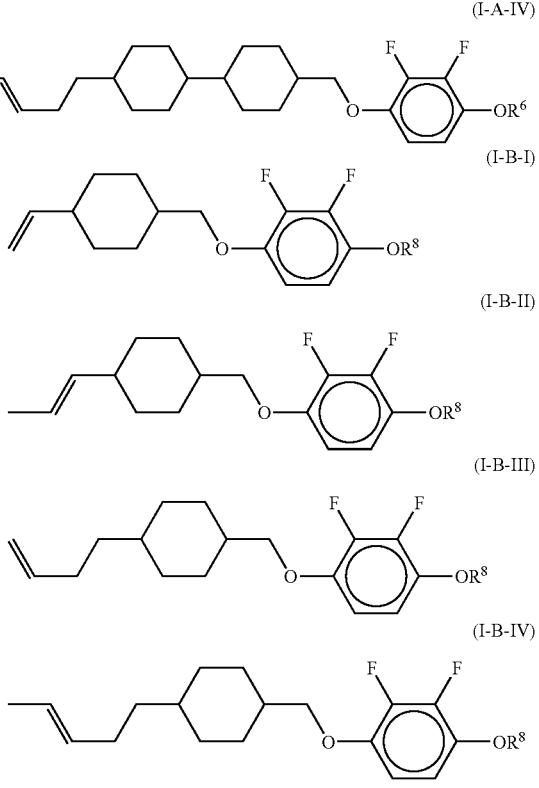

(wherein $R^6$ and $R^8$ each represent, independently, an alkenyl group of 3 to 7 carbon atoms).

Moreover, the general formula (I) preferably represents a compound represented by general formula (1):

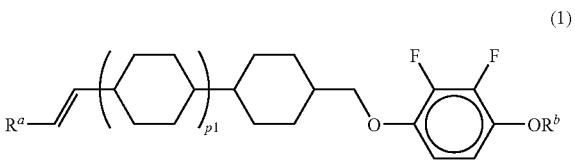

(wherein $R^a$ represents a hydrogen atom or a linear alkyl group of 1 to 3 carbon atoms, $R^b$ represents an alkenyl group of 3 to 7 carbon atoms, and p1 represents 0, 1, or 2).

The nematic liquid crystal composition in the present invention includes either one or at least two compounds represented by general formula (II) as a second component, however the number of the compounds is preferably 1 to 12, more preferably 1 to 8, and yet more preferably 1 to 6.

Compounds represented by general formula (II) have an effect of reducing the viscosity although there is almost no effect of increasing the absolute value of the dielectric constant anisotropy. Therefore, the content ratio thereof is preferably high when the low viscosity is prioritized, and the content ratio thereof is preferably low when the increase of the absolute value of the dielectric constant anisotropy is prioritized.

In general formula (II), preferably $R^3$ and $R^4$ each represent, independently, an alkyl group of 1 to 10 carbon atoms, an alkenyl group of 2 to 10 carbon atoms, an alkoxy group of 1 to 10 carbon atoms, or an alkenyloxy group of 3 to 10 carbon atoms, more preferably $R^3$ represents an alkyl group of 1 to 10 carbon atoms or an alkenyl group of 2 to 10 carbon atoms, and $R^4$ represents an alkyl group of 1 to 10 carbon atoms, an alkoxy group of 1 to 10 carbon atoms, or an alkenyl group of 2 to 10 carbon atoms, yet more preferably $R^3$ represents an alkyl group of 1 to 5 carbon atoms or an alkenyl group of 2 to 5 carbon atoms, and $R^4$ represents an alkyl group of 1 to 5 carbon atoms, an alkoxy group of 1 to 5 carbon atoms, or an alkenyl group of 2 to 5 carbon atoms, and even more preferably at least one of $R^3$ and $R^4$ represents an alkenyl group.

Specifically, it is preferable that $R^3$ represent —$CH_3$, —$CH_2CH_3$, —$(CH_2)_2CH_3$, —$(CH_2)_3CH_3$, —$(CH_2)_4$—$CH_3$, —$(CH_2)_5CH_3$, —$(CH_2)_6CH_3$, —$(CH_2)_7CH_3$, —$CH=CH_2$, —$CH=CHCH_3$ (E-form), —$(CH_2)_2CH=CH_2$, —$(CH_2)_2CH=CHCH_3$ (E-form), —$(CH_2)_4$—$CH=CH_2$, —$(CH_2)_4$—$CH=CHCH_3$ (E-form), or —$(CH_2)_6CH=CH_2$, and $R^4$ represents —$CH_3$, —$CH_2CH_3$, —$(CH_2)_2CH_3$, —$(CH_2)_3CH_3$, —$(CH_2)_4$—$CH_3$, —$(CH_2)_5CH_3$, —$(CH_2)_6CH_3$, —$(CH_2)_7CH_3$, —$OCH_3$, —$OCH_2CH_3$, —$O(CH_2)_2CH_3$, —$O(CH_2)_3CH_3$, —$O(CH_2)_4$—$CH_3$, —$O(CH_2)_5CH_3$, —$O(CH_2)_6CH_3$, —$O(CH_2)_7CH_3$, —$CH\_CH_2$, —$CH=CHCH_3$ (E-form), —$(CH_2)_2CH=CH_2$, —$(CH_2)_2CH=CHCH_3$ (E-form), —$(CH_2)_4$—$CH=CH_2$, —$(CH_2)_4$—$CH=CHCH_3$ (E-form), or —$(CH_2)_6CH=CH_2$.

Preferably $B^1$ and $B^2$ each represent, independently, trans-1,4-cyclohexylene group (including those in which one $CH_2$ group, or at least two $CH_2$ groups that are not adjacent, are substituted with an oxygen atom or a sulfur atom), 1,4-phenylene group (including those in which one CH group or at least two CH groups are substituted with a nitrogen atom), 1,4-cyclohexenylene group, 1,4-bicyclo[2.2.2]octylene group, piperidine-1,4-diyl group, naphthalene-2,6-diyl group, decahydronaphthalene-2,6-diyl group, 1,2,3,4-tetrahydronaphthalene-2,6-diyl group, or a substituent thereof in which a hydrogen atom is substituted with a fluorine atom, more preferably trans-1,4-cyclohexylene group, 1,4-phenylene group, fluorine-substituted 1,4-phenylene group, or 1,4-bicyclo[2.2.2]octylene group, and particularly preferably trans-1,4-cyclohexylene group, or 1,4-phenylene group.

Preferably $Y^1$ and $Y^2$ each represent, independently, —$CH_2CH_2$—, —$CH=CH$— (E-form), —$CH(CH_3)CH_2$—, —$CH_2CH(CH_3)$—, —$CH(CH_3)CH(CH_3)$—, —$CF_2CF_2$—, —$CF=CF$— (E-form), —$CH_2O$—, —$OCH_2$—, —$OCH(CH_3)$—, —$CH(CH_3)O$—, —$(CH_2)_4$—, —$(CH_2)_3O$—, —$O(CH_2)_3$—, —$C\equiv C$—, —$CF_2O$—, —$OCF_2$—, —COO—, —OCO—, —COS—, —SCO—, or a single bond, more preferably —$CH_2CH_2$—, —$CH=CH$— (E-form), —$CH(CH_3)CH_2$—, —$CH_2CH(CH_3)$—, —$CF_2CF_2$—, —$CF=CF$— (E-form), —$CH_2O$—, —$OCH_2$—, —$OCH(CH_3)$—, —$CH(CH_3)O$—, —$C\equiv C$—, —$CF_2O$—, —$OCF_2$—, or a single bond, and yet more preferably —$CH_2CH_2$—, —$CH=CH$— (E-form), or a single bond.

In more detail, preferably the general formula (II) represents a compound represented by the following general formula (II-A) through general formula (II-G) as a specific structure:

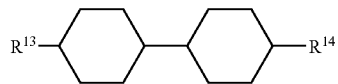

(II-A)

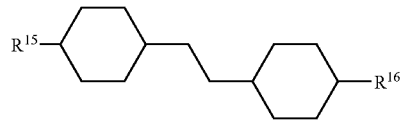

(II-B)

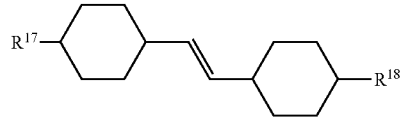

(II-C)

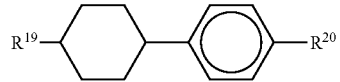

(II-D)

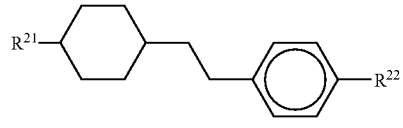

(II-E)

(II-F)

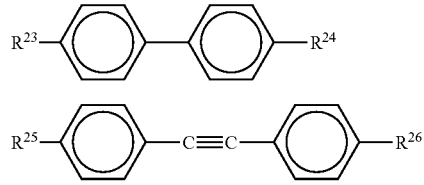

(II-G)

(wherein $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ $R^{25}$, and $R^{26}$ each represent, independently, an alkyl group of 1 to 10 carbon atoms, an alkoxy group of 1 to 10 carbon atoms, an alkenyl group of 2 to 10 carbon atoms, or an alkenyloxy group of 3 to 10 carbon atoms).

Preferably, $R^{13}$, $R^{15}$, $R^{17}$, $R^{19}$, $R^{21}$, $R^{23}$ and $R^{25}$ represent —$CH_3$, —$CH_2CH_3$, —$(CH_2)_2CH_3$, —$(CH_2)_3CH_3$, —$(CH_2)_4$—$CH_3$, —$(CH_2)_5CH_3$, —$(CH_2)_6CH_3$, —$(CH_2)_7CH_3$, —$CH=CH_2$, —$CH_2=CHCH_3$ (E-form), —$(CH_2)_2CH=CH_2$, —$(CH_2)_2CH=CHCH_3$ (E-form), —$(CH_2)_4$—$CH=CH_2$, —$(CH_2)_4$—$CH=CHCH_3$ (E-form), or —$(CH_2)_6CH=CH_2$, and $R^{14}$, $R^{16}$, $R^{18}$, $R^{20}$, $R^{22}$, $R^{24}$, and $R^{26}$ represent —$CH_3$, —$CH_2CH_3$, —$(CH_2)_2CH_3$, —$(CH_2)_3CH_3$, —$(CH_2)_4$—$CH_3$, —$(CH_2)_5CH_3$, —$(CH_2)_6CH_3$, —$(CH_2)_7CH_3$, —$OCH_3$, —$OCH_2CH_3$, —$O(CH_2)_2CH_3$, —$O(CH_2)_3CH_3$, —$O(CH_2)_4$—$CH_3$, —$O(CH_2)_5CH_3$, —$O(CH_2)_6CH_3$, —$O(CH_2)_7CH_3$, —$CH=CH_2$, —$CH=CHCH_3$ (E-form), —$(CH_2)_2CH=CH_2$, —$(CH_2)_2CH=CHCH_3$ (E-form), —$(CH_2)_4$—$CH=CH_2$, —$(CH_2)_4$—$CH=CHCH_3$ (E-form), or —$(CH_2)_6CH=CH_2$.

Moreover, preferable examples of a compound represented by the general formula (II), in which at least one of $R^3$ and $R^4$ represents an alkenyl group, include the group of the following compounds.

general formula (II-A-1) through general formula (II-A-8)

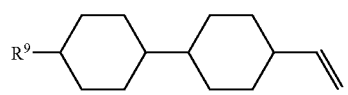

(II-A-1)

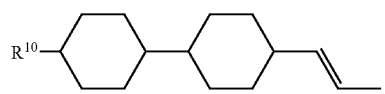

(II-A-2)

-continued

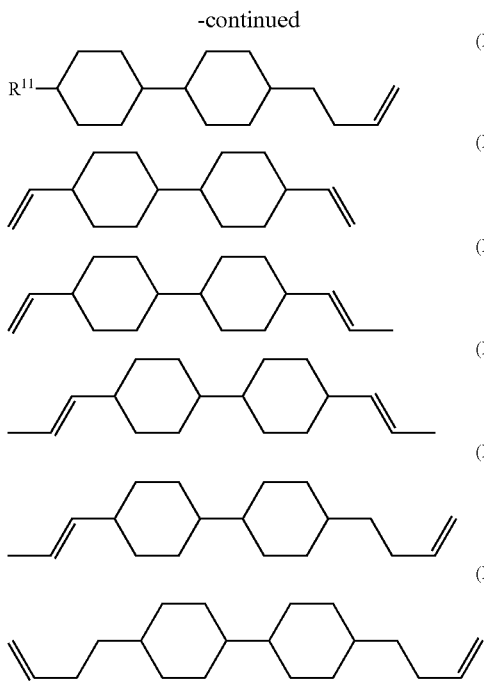

(II-A-3)
(II-A-4)
(II-A-5)
(II-A-6)
(II-A-7)
(II-A-8)

(wherein $R^9$, $R^{10}$, and $R^{11}$ each represent, independently, an alkyl group of 1 to 10 carbon atoms or an alkoxy group of 1 to 10 carbon atoms).

Preferably $R^9$, $R^{10}$, and $R^{11}$ represent —CH$_3$, —CH$_2$CH$_3$, —(CH$_2$)$_2$CH$_3$, —(CH$_2$)$_3$CH$_3$, —(CH$_2$)$_4$CH$_3$, —(CH$_2$)$_5$CH$_3$, —(CH$_2$)$_6$CH$_3$, —(CH$_2$)$_7$CH$_3$, —OCH$_3$, —OCH$_2$CH$_3$, —O(CH$_2$)$_2$CH$_3$, —O(CH$_2$)$_3$CH$_3$, —O(CH$_2$)$_4$—CH$_3$, —O(CH$_2$)$_5$CH$_3$, —O(CH$_2$)$_6$CH$_3$, or —O(CH$_2$)$_7$CH$_3$, and more preferably —CH$_3$, —CH$_2$CH$_3$, —(CH$_2$)$_2$CH$_3$, —(CH$_2$)$_3$CH$_3$, or —(CH$_2$)$_4$—CH$_3$.

Of compounds represented by general formula (II-A-1) through general formula (II-A-8), compounds represented by general formula (II-A-1), general formula (II-A-2), or general formula (II-A-3) are particularly preferred:

general formula (II-B-1) through general formula (II-B-7)

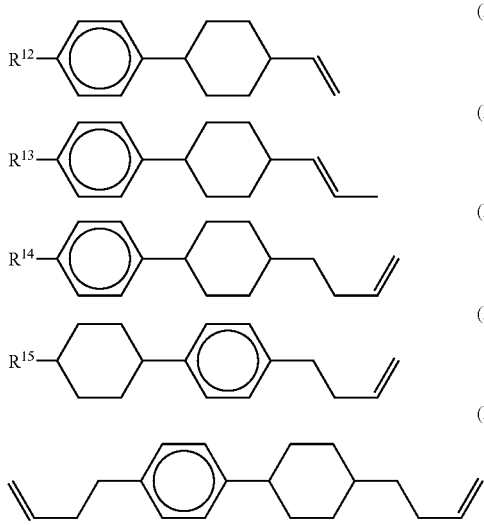

(II-B-1)
(II-B-2)
(II-B-3)
(II-B-4)
(II-B-5)
(II-B-6)
(II-B-7)

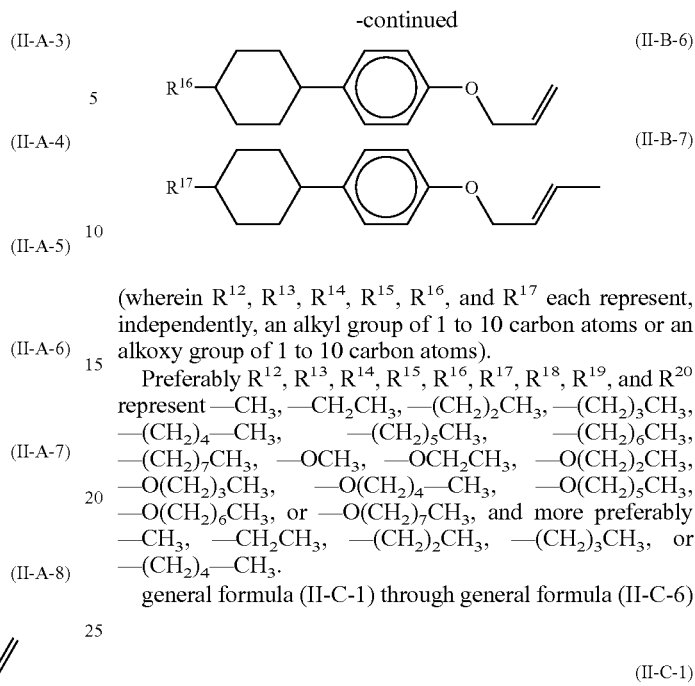

(wherein $R^{12}$, $R^{13}$, $R^{14}$, $R^{15}$, $R^{16}$, and $R^{17}$ each represent, independently, an alkyl group of 1 to 10 carbon atoms or an alkoxy group of 1 to 10 carbon atoms).

Preferably $R^{12}$, $R^{13}$, $R^{14}$, $R^{15}$, $R^{16}$, $R^{17}$, $R^{18}$, $R^{19}$, and $R^{20}$ represent —CH$_3$, —CH$_2$CH$_3$, —(CH$_2$)$_2$CH$_3$, —(CH$_2$)$_3$CH$_3$, —(CH$_2$)$_4$—CH$_3$, —(CH$_2$)$_5$CH$_3$, —(CH$_2$)$_6$CH$_3$, —(CH$_2$)$_7$CH$_3$, —OCH$_3$, —OCH$_2$CH$_3$, —O(CH$_2$)$_2$CH$_3$, —O(CH$_2$)$_3$CH$_3$, —O(CH$_2$)$_4$—CH$_3$, —O(CH$_2$)$_5$CH$_3$, —O(CH$_2$)$_6$CH$_3$, or —O(CH$_2$)$_7$CH$_3$, and more preferably —CH$_3$, —CH$_2$CH$_3$, —(CH$_2$)$_2$CH$_3$, —(CH$_2$)$_3$CH$_3$, or —(CH$_2$)$_4$—CH$_3$.

general formula (II-C-1) through general formula (II-C-6)

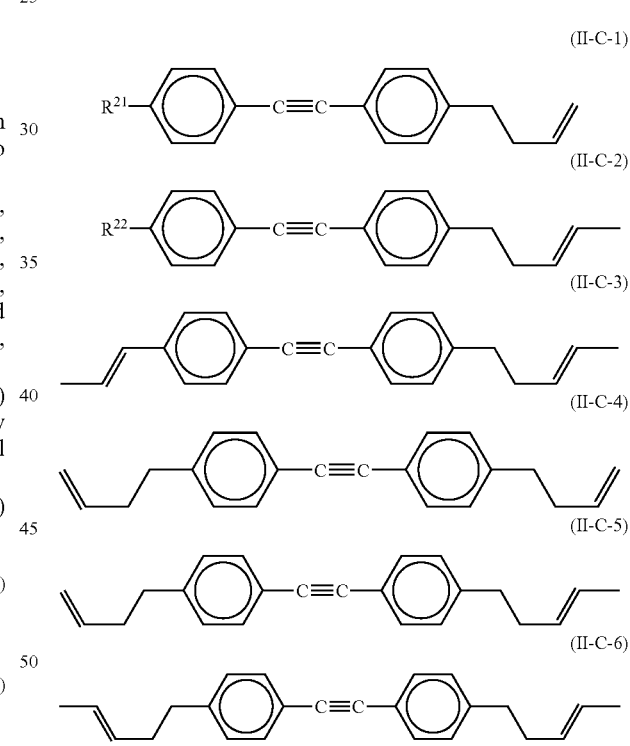

(II-C-1)
(II-C-2)
(II-C-3)
(II-C-4)
(II-C-5)
(II-C-6)

(wherein $R^{21}$ and $R^{22}$, each represent, independently, an alkyl group of 1 to 10 carbon atoms or an alkoxy group of 1 to 10 carbon atoms).

Preferably $R^{21}$, $R^{22}$, $R^{23}$, and $R^{24}$ represent —CH$_3$, —CH$_2$CH$_3$—(CH$_2$)$_2$CH$_3$—(CH$_2$)$_3$CH$_3$, —(CH$_2$)$_4$—CH$_3$, —(CH$_2$)$_5$CH$_3$, —(CH$_2$)$_6$CH$_3$, —(CH$_2$)$_7$CH$_3$, —OCH$_3$, —OCH$_2$CH$_3$, —O(CH$_2$)$_2$CH$_3$, —O(CH$_2$)$_3$CH$_3$, —O(CH$_2$)$_4$—CH$_3$, —O(CH$_2$)$_5$CH$_3$, —O(CH$_2$)$_6$CH$_3$, or —O(CH$_2$)$_7$CH$_3$, and more preferably —CH$_3$, —CH$_2$CH$_3$, —(CH$_2$)$_2$CH$_3$, —(CH$_2$)$_3$CH$_3$, or —(CH$_2$)$_4$—CH$_3$.

Of compounds represented by general formula (II-C-1) through general formula (II-C-6), compounds represented by general formula (II-C-1), general formula (II-C-2), or general formula (II-C-4) are particularly preferred:

general formula (II-D-1) through general formula (II-D-5):

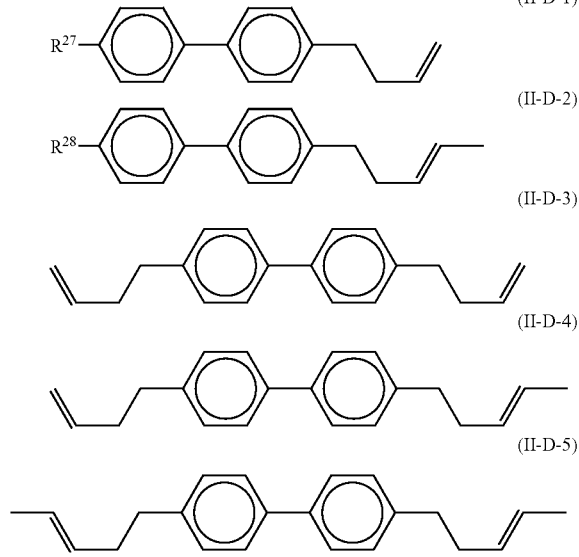

(wherein $R^{27}$ and $R^{28}$ each represent, independently, an alkyl group of 1 to 10 carbon atoms or an alkoxy group of 1 to 10 carbon atoms).

Preferably $R^{25}$, $R^{26}R^{27}$, and $R^{28}$ represent —$CH_3$, —$CH_2CH_3$, —$(CH_2)_2CH_3$, —$(CH_2)_3CH_3$, —$(CH_2)_4$—$CH_3$, —$(CH_2)_5CH_3$, —$(CH_2)_6CH_3$, —$(CH_2)_7CH_{33}$—$OCH_3$, —$OCH_2CH_3$, —$O(CH_2)_2CH_3$, —$O(CH_2)_3CH_3$, —$O(CH_2)_4$—$CH_3$, —$O(CH_2)_5CH_3$, —$O(CH_2)_6CH_3$, or —$O(CH_2)_7CH_3$, and more preferably —$CH_3$, —$CH_2CH_3$, —$(CH_2)_2CH_3$, —$(CH_2)_3CH_3$, or —$(CH_2)_4$—$CH_3$.

Preferably, a nematic liquid crystal composition of the present invention includes: 10 to 80% by mass of either one or at least two compounds selected from the group of compounds represented by general formula (I-A) and general formula (I-B); and 20 to 70% by mass of either one or at least two compounds selected from the group of compounds represented by general formula (II-A-1) through general formula (II-A-8), and/or either one or at least two compounds selected from the group of compounds represented by general formula (II-B-1) through general formula (I-B-14), and/or either one or at least two compounds represented by general formula (II-C-1) through general formula (II-C-14), and/or either one or at least two compounds selected from the group of compounds represented by general formula (II-D-1) through general formula (II-D-14).

More preferably, a nematic liquid crystal composition of the present invention includes: 10 to 80% by mass of either one or at least two compounds selected from the group of compounds represented by general formula (I-A-I) through general formula (I-A-IV) and general formula (I-B-I) through general formula (I-B-IV); and 20 to 70% by mass of either one or at least two compounds selected from the group of compounds represented by general formula (II-A-1) through general formula (II-A-8), and/or either one or at least two compounds selected from the group of compounds represented by general formula (II-B-1) through general formula (II-B-14), and/or either one or at least two compounds selected from the group of compounds represented by general formula (II-C-1) through general formula (II-C-14), and/or either one or at least two compounds selected from the group of compounds represented by general formula (II-D-1) through general formula (II-D-14).

Also, a nematic liquid crystal composition of the present invention more preferably includes 20 to 70% by mass of either one or at least two compounds selected from the group of compounds represented by general formula (I-A-I) through general formula (I-A-IV) and general formula (I-B-I) through general formula (I-B-IV), and even more preferably 30 to 60% by mass thereof.

Even more preferably, a nematic liquid crystal composition of the present invention includes 30 to 60% by mass of either one or at least two compounds selected from the group of compounds represented by general formula (II-A-1) through general formula (II-A-8), and/or either one or at least two compounds selected from the group of compounds represented by general formula (II-B-1) through general formula (II-B-14), and/or either one or at least two compounds selected from the group of compounds represented by general formula (II-C-1) through general formula (II-C-14), and/or either one or at least two compounds selected from the group of compounds represented by general formula (II-D-1) through general formula (II-D-14), and more preferably 40 to 50% by mass thereof.

Even still more preferably, a nematic liquid crystal composition of the present invention includes 30 to 60% by mass of either one or at least two compounds selected from the group of compounds represented by general formula (II-A-1) through general formula (II-A-8), and/or either one or at least two compounds selected from the group of compounds represented by general formula (II-B-1) through general formula (II-B-14), and/or either one or at least two compounds selected from the group of compounds represented by general formula (II-C-1) through general formula (II-C-14), and/or either one or at least two compounds selected from the group of compounds represented by general formula (II-D-1) through general formula (II-D-14), and more preferably 40 to 50% by mass thereof.

Moreover, it is also preferable that a nematic liquid crystal composition of the present invention includes either one or at least two compounds selected from the group of compounds represented by general formula (III-A) through general formula (III-J), as an additional component:

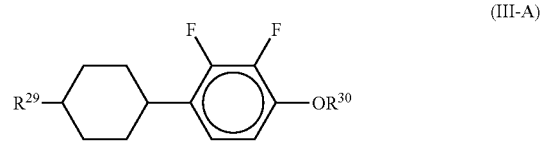

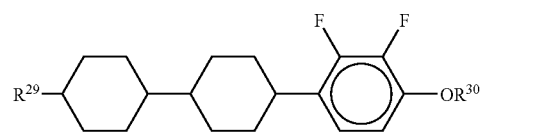

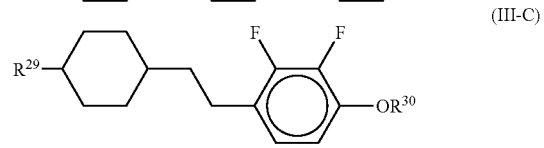

-continued

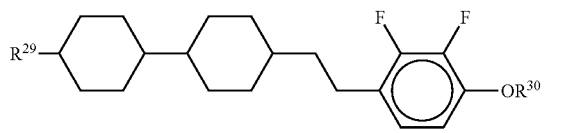
(III-D)

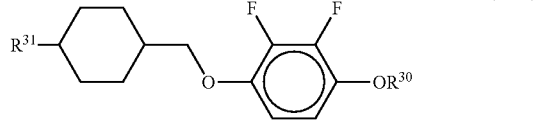
(III-E)

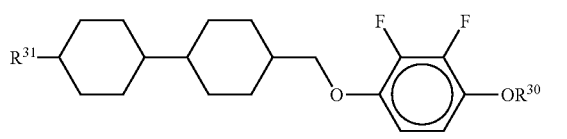
(III-F)

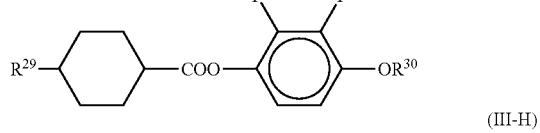
(III-G)

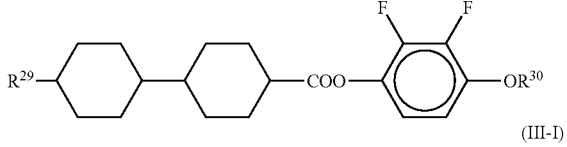
(III-H)

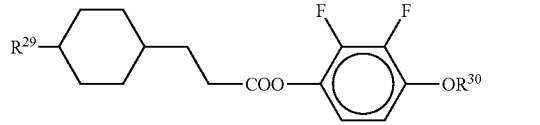
(III-I)

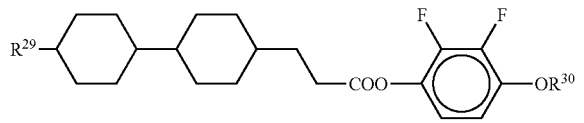
(III-J)

(wherein $R^{29}$ and $R^{30}$ each represent, independently, an alkyl group of 1 to 10 carbon atoms or an alkenyl group of 2 to 10 carbon atoms, in which one $CH_2$ group, or at least two $CH_2$ groups that are not adjacent, may be substituted with O and/or S, and one or at least two hydrogen atoms may be substituted with F or Cl; and $R^{31}$ represents an alkyl group of 1 to 10 carbon atoms, in which one $CH_2$ group, or at least two $CH_2$ groups that are not adjacent, may be substituted with O and/or S, and one or at least two hydrogen atoms may be substituted with F or Cl).

In general formula (III-A) through general formula (III-J), preferably $R^{29}$ represents —$CH_3$, —$CH_2CH_3$, —$(CH_2)_2CH_3$, —$(CH_2)_3CH_3$, —$(CH_2)_4$—$CH_3$, —$(CH_2)_5CH_3$, —$(CH_2)_6CH_3$, —$(CH_2)_7CH_3$, —$CH$=$CH_2$, —$CH$=$CHCH_3$ (E-form), —$(CH_2)_2CH$=$CH_2$, —$(CH_2)_2CH$=$CHCH_3$ (E-form), —$(CH_2)_4$—$CH$=$CH_2$, —$(CH_2)_4$—$CH$=$CHCH_3$ (E-form), or —$(CH_2)_6CH$=$CH_2$, and $R^{30}$ represents —$CH_3$, —$CH_2CH_3$, —$(CH_2)_2CH_3$, —$(CH_2)_3CH_3$, —$(CH_2)_4$—$CH_3$, —$(CH_2)_5CH_3$, —$(CH_2)_6CH_3$, —$(CH_2)_7CH_3$, —$(CH_2)_2CH$=$CH_2$, —$(CH_2)_2CH$=$CHCH_3$ (E-form), —$(CH_2)_4$—$CH$=$CH_2$, —$(CH_2)_4$—$CH$=$CHCH_3$ (E-form), or —$(CH_2)_6CH$=$CH_2$.

Of compounds represented by general formula (III-A) through general formula (III-J), compounds represented by general formula (III-E) through general formula (III-F) are more preferred.

In the present invention, the nematic phase-isotropic liquid phase transition temperature (Tni) is preferably 70° C. or more, more preferably 75° C. or more, and yet more preferably 80° C. or more. Since the nematic phase-isotropic liquid phase transition temperature (Tni) is preferably as high as possible, it is not necessary to particularly limit the upper limit thereof. However, the practical upper limit can be set, for example to 130° C.

The dielectric constant anisotropy (Δ∈) at 25° C. is preferably −2.0 or less, more preferably −2.5 or less, and yet more preferably −3.0 or less. Since the absolute value of the dielectric constant anisotropy (Δ∈) is preferably as large as possible, it is not necessary to particularly limit the lower limit thereof. However, the practical lower limit can be set, for example to −8.0.

The refractive index anisotropy (Δn) at 25° C. is preferably 0.10 or more, and more preferably 0.12, when a thin cell gap is dealt with. The refractive index anisotropy (Δn) at 25° C. is more preferably 0.095 or less, and even more preferably 0.085 or less, when a thick cell gap is dealt with. Since the refractive index anisotropy (Δn) is adjusted according to the respective optimum value of the retardation represented by the product (Δn×d) of the refractive index anisotropy (Δn) and the cell gap (d), it is not necessary to particularly limit the range thereof. However, the practical range can be set, for example, between 0.06 or more and 0.16 or less.

The viscosity is preferably 30 mPa·s or less, and more preferably 25 mPa·s or less, and yet more preferably 20 mPa·s or less. Since the viscosity is preferably as low as possible, it is not necessary to particularly limit the lower limit thereof. However, the practical lower limit can be set, for example to 10 mPa·s.

The above nematic liquid crystal composition is useful for liquid crystal display elements, in particular liquid crystal display elements for active matrix driving, and may be used for liquid crystal display elements for VA mode, IPS mode, or ECB mode.

The nematic liquid crystal composition of the present invention may contain normal nematic liquid crystals, smectic liquid crystals, cholesteric liquid crystals, and the like, in addition to the abovementioned compounds.

Examples of the production of compounds represented by general formula (1) constituting the present invention are shown below.

(Process 1)

A diketone compound represented by formula (9):

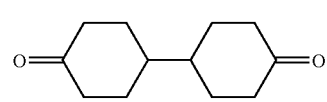
(9)

is reacted with an ylide prepared from methoxymethyl triphenylphosphonium chloride, to yield a compound represented by formula (10):

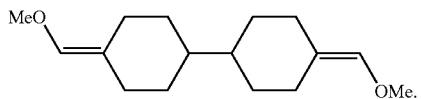
(10)

This reaction is generally called the Wittig reaction. The obtained compound of formula (10) is subjected to acid catalytic hydrolysis, and further cis-trans isomerization under a basic condition, to thereby obtain a compound represented by formula (11):

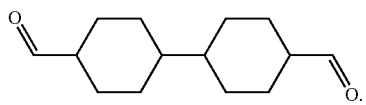
(11)

The obtained compound of formula (11) is reacted with an ylide prepared from methyl triphenylphosphonium bromide, to yield a compound represented by formula (12):

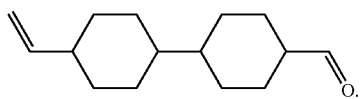
(12)

The obtained compound of formula (12) is reduced using a reductant such as sodium boron hydride, to obtain a compound represented by formula (13):

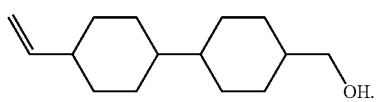
(13)

The obtained compound of formula (13) is converted into a compound represented by general formula (14):

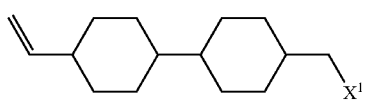
(14)

(wherein $X^1$ represents a chlorine atom, a bromine atom, an iodine atom, a benzenesulfonyloxy group, a p-toluenesulfonyloxy group, a methanesulfonyloxy group, or a trifluoromethanesulfonyloxy group), and reacted with a phenolate prepared from a phenol compound represented by general formula (15):

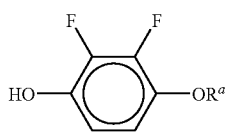
(15)

(wherein $R^a$ represents the same meaning as that of general formula (1)), and thereby a compound represented by general formula (16):

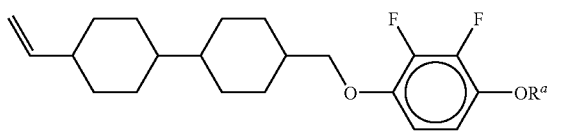
(16)

(wherein $R^a$ represents the same meaning as that of general formula (1)) can be obtained.

(Process 2)

A compound represented by formula (17):

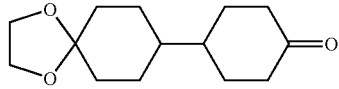
(17)

is subjected to a similar reaction to the conversion from formula (9) into formula (11), to thereby obtain a compound represented by formula (18):

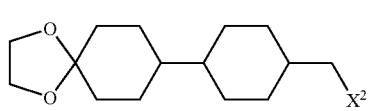
(18)

The obtained compound of formula (18) is reduced using a reductant such as sodium boron hydride, to obtain a compound represented by formula (19):

(19)

The obtained compound of formula (19) is converted into a compound represented by general formula (20):

(20)

(wherein $X^2$ represents the same meaning as $X^1$ of general formula (14)), and deprotected under an acidic condition, to thereby obtain a compound represented by general formula (21):

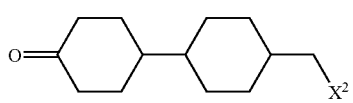
(21)

(wherein $X^2$ represents the same meaning as $X^1$ of general formula (14)). The obtained compound represented by general formula (21) is subjected to a similar reaction to the conversion from formula (9) into formula (11), to thereby obtain a compound represented by formula (22):

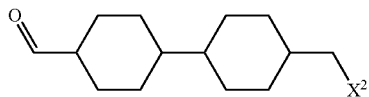
(22)

(wherein $X^2$ represents the same meaning as $X^1$ of general formula (14)). The obtained compound represented by general formula (22) is reduced using a reductant such as sodium boron hydride, to obtain a compound represented by general formula (23):

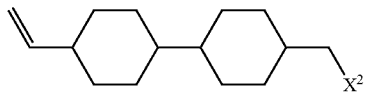
(23)

(wherein $X^2$ represents the same meaning as $X^1$ of general formula (14)). The obtained compound represented by general formula (23) is reacted with a phenolate prepared from a phenol compound represented by general formula (15), and thereby a compound represented by general formula (16) can be obtained.

(Process 3)

A compound represented by formula (24):

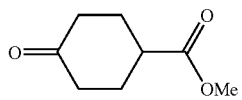
(24)

is subjected to a similar reaction to the conversion from formula (9) into formula (12), to thereby obtain a compound represented by formula (25):

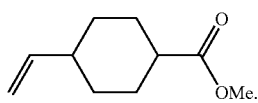
(25)

The obtained compound represented by formula (25) is reduced using a reductant such as lithium aluminum hydride, sodium bis(2-methoxyethoxy)aluminum hydride, to obtain a compound represented by formula (26):

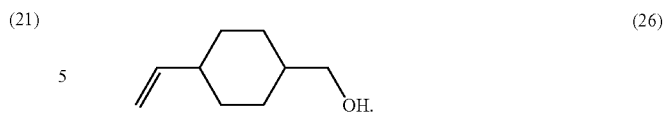
(26)

The obtained compound represented by formula (26) is converted into a compound represented by general formula (27):

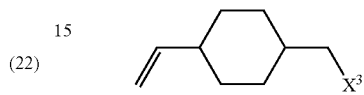
(27)

(wherein $X^3$ represents the same meaning as $X^1$ of general formula (14)), and reacted with a phenolate prepared from a phenol compound represented by formula (15), and thereby a compound represented by formula (28):

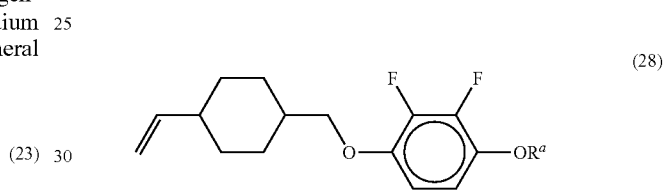
(28)

(wherein $R^a$ represents the same meaning as that of general formula (1)) can be obtained.

EXAMPLES

Hereunder is a further detailed description of the present invention with reference to examples. However the present invention is not to be limited by these examples. The structures of compounds were identified by nuclear magnetic resonance spectrum (NMR), mass spectrum (MS), and so on.

Moreover, the term "%" in compositions of the following examples and comparative examples refers to "% by mass".

In the examples, the following properties were measured.

$T_{NI}$: nematic-isotropic phase transition temperature (° C.)

Δn: birefringence at 25° C.

Δ∈: dielectric constant anisotropy at 25° C.

η: viscosity (mPa·s) (20° C.)

The following abbreviations are used in the description of compounds.

THF: tetrahydrofuran
DMF: N,N-dimethylformamide
Me: methyl group
Et: ethyl group
Bu: butyl group
Pen: pentyl group
Pr: propyl group
Ph: phenyl group
Ms: methanesulfonyl group

Example 1

Synthesis of 1-((E)-2-butenoxy)-2,3-difluoro-4-(trans-4-(trans-4-vinylcyclohexyl)cyclohexyl)methoxy benzene (1a)

(1-1) Synthesis of 4-(2-butenoxy)-2,3-difluorophenol

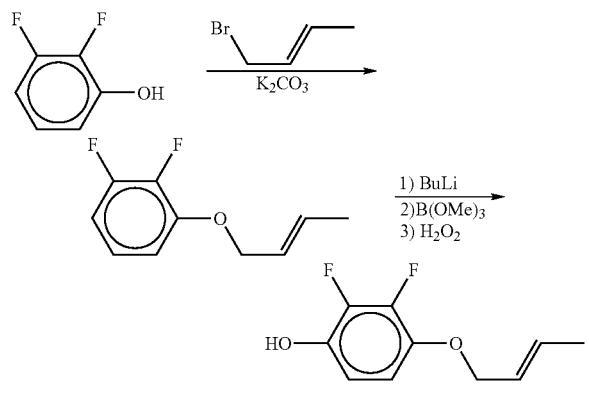

(1-1-1) Synthesis of 1-(2-butenoxy)-2,3-difluorobenzene 122 g of anhydrous potassium carbonate was added to a 2-butanone (600 mL) solution containing 77.2 g of 2,3-difluorophenol, and then 90.0 mL of 1-bromo-2-butene (E/Z ratio=92/8) was added thereto. The solution was heated under reflux for 4 hours, then cooled to room temperature, and water was added dropwise thereto to stop the reaction. Extraction was performed with hexane (three times), and the collected organic phase was washed with 3M hydrochloric acid, water, saturated aqueous solution of sodium hydrogencarbonate, and saturated saline in this order, and then dried over anhydrous magnesium sulfate. The solvent was evaporated under reduced pressure (155 to 160° C., 50 kPa), to thereby obtain 106 g of 1-(2-butenoxy)-2,3-difluorobenzene in the form of a colorless and transparent liquid (E/Z ratio=82/18 according to $^1$H-NM analysis).

$^1$H-NMR (400 MHz, CDCl$_3$)

δ (ppm) 1.73-1.76 (m, 3H), 4.53 (d, 1.64H, E-form), 4.68 (m, 0.36H, Z-form), 5.68-5.92 (m, 2H), 6.72-6.78 (m, 2H), 6.92-6.98 (m, 1H)

(1-1-2) Synthesis of 4-(2-butenoxy)-2,3-difluorophenol 225 mL of 2.67 M butyllithium hexane solution was added dropwise to THF (500 mL) solution containing 96.0 g of 1-(2-butenoxy)-2,3-difluorobenzene under vigorous stirring at −50° C. or lower, while keeping the internal temperature, and then the stirring was continued for 1 hour at −50° C. While keeping the internal temperature, THF (60 mL) solution containing 63.3 g of trimethyl borate was added dropwise. The stirring was continued for 30 minutes while keeping the temperature, and then the temperature was increased to 0° C. While keeping the internal temperature, 120 mL of water was added dropwise, and then 160 mL of 15% hydrogen peroxide solution was further added dropwise. The stirring was continued for 1 hour at 0° C. The solution was heated to room temperature, and the stirring was further continued for 2 hours. Then, saturated saline was added to separate the organic phase, and extraction was performed from the water phase with toluene (twice). The organic phase was collected, then washed with 10% sodium thiosulfate aqueous solution, 3M hydrochloric acid, water, saturated aqueous solution of sodium hydrogencarbonate, and saturated saline in this order, and dried over anhydrous magnesium sulfate. The solvent was evaporated. The obtained residue was purified by column chromatography, and was subjected to recrystallization, to thereby obtain 42.7 g of 4-(2-butenoxy)-2,3-difluorophenol in the form of pale yellow needle-like crystals (E/Z ratio=99/1, according to $^1$H-NMR analysis).

$^1$H-NMR (400 MHz, CDCl$_3$)

δ(ppm) 1.703-1.75 (m, 3H), 4.46 (d, 1.98H, E-form), 4.61 (m, 0.02H, Z-form), 5.28 (br, 1H), 5.66-5.88 (m, 2H), 6.62-6.69 (m, 2H)

(1-2) Synthesis of 1-((E)-2-butenoxy)-2,3-difluoro-4-(trans-4-(trans-4-vinylcyclohexyl)cyclohexyl) methoxy benzene

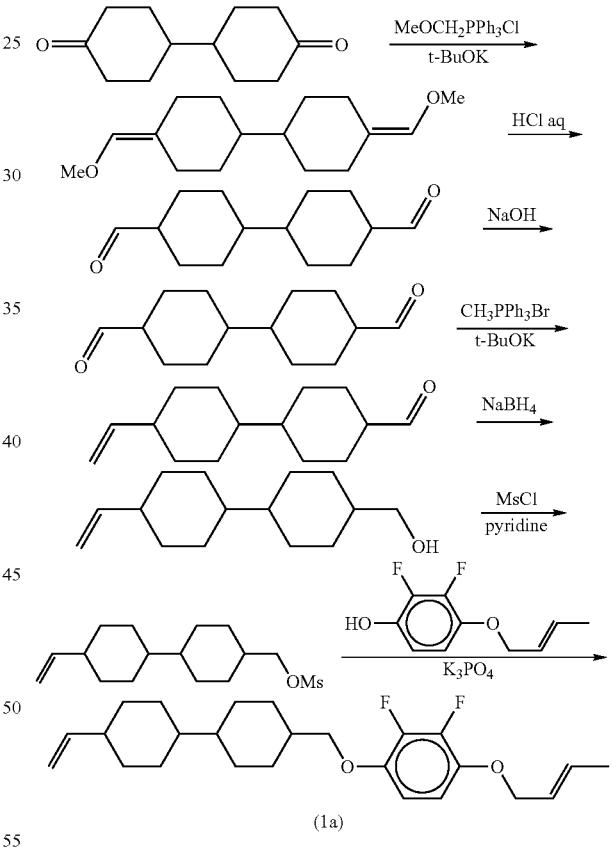

(1-2-1) synthesis of 4,4'-bismethoxymethylidene bicyclohexyl 882.3 g of methoxymethyltriphenylphosphonium chloride was dispersed in 2600 mL of THF, and was cooled to −10° C. while keeping the internal temperature, 313.2 g of potassium-t-butoxide was added thereto. While keeping the internal temperature, the solution was stirred for 1 hour, and then THF (800 mL) solution containing 200.0 g of bicyclohexyl-4,4'-dione was added dropwise. While keeping the internal temperature, the solution was stirred for 1 hour, and then water was added to stop the reaction. The solvent was evaporated under reduced pressure. Then, the residue was added with hexane, was vigorously stirred, and was subjected to filtration (twice). The resultant product was mixed with the filtrate, then washed with 50% methanol aqueous solution and saturated saline in this order, and dried over anhydrous magnesium sulfate. The solvent was evaporated, to obtain 231.8 g of a white solid.

(1-2-2) Synthesis of trans,trans-bicyclohexyl-4,4'-dicarbaldehyde 700 mL of 10% hydrochloric acid was added to THF (930 mL) solution containing 231.8 g of the solid obtained in (1-2-1), and the solution was heated under reflux for 1 hour. The reaction solution was allowed to cool. Then, the organic phase was separated, and extraction was performed from the water phase with toluene (four times). The collected organic phase was washed with saturated saline, and then dried over anhydrous magnesium sulfate. The solvent was evaporated under reduced pressure, to obtain 204.5 g of reddish brown liquid. The resultant liquid was dissolved in 800 mL of methanol, and 80 mL of 10% sodium hydroxide aqueous solution was added dropwise thereto under vigorous stirring at −10° C., while keeping the internal temperature. The solution was stirred for 2 hours, while keeping the internal temperature. Water was added thereto, and the precipitated solid was filtered off by suction filtration. The obtained solid was washed with water and methanol in this order, and dried, to obtain 189.4 g of a white solid.

(1-2-3) Synthesis of 4'-vinylbicyclohexyl-4-carbaldehyde 192.5 g of methyltriphenylphosphonium bromide was dispersed in 580 mL of THF, and 66.6 g of potassium-t-butoxide was added thereto under vigorous stirring at −10° C. While keeping the internal temperature, the solution was stirred for 1 hour and then was added dropwise to THF (1800 mL) solution containing 120.0 g of the solid obtained in (1-2-2) at the internal temperature of 5 to 10° C. While keeping the internal temperature, the solution was stirred for 1 hour, and then water was added to stop the reaction. The reaction solution was washed with 5% ammonium chloride aqueous solution. The solvent of the organic phase was evaporated. The residue was added with hexane and toluene, and was washed with 50% methanol-water. The resultant product was dried over anhydrous magnesium sulfate. Then, the solvent was evaporated under reduced pressure, to obtain 60.1 g of a substantially colorless solid.

(1-2-4) Synthesis of trans-4-(trans-4-vinylcyclohexyl)cyclohexylmethanol

THF (180 mL) solution containing 60.1 g of the substantially colorless solid obtained in (1-2-3) was added dropwise to an ethanol (120 mL) solution containing 1.65 g of sodium borohydride under stirring at −10° C., while keeping the internal temperature. The solution was heated to room temperature, and then was stirred for 2 hours. Water, ethyl acetate, and ammonium chloride aqueous solution were added thereto to stop the reaction. The reaction solution was added with saturated saline. Then, the organic phase was separated, and extraction was performed from the water phase with ethyl acetate (twice). The collected organic phase was washed with saturated saline, and dried over anhydrous magnesium sulfate. The solvent was evaporated under reduced pressure. The obtained residue was purified by column chromatography, to thereby obtain 15.4 g of trans-4-(trans-4-vinylcyclohexyl)cyclohexylmethanol in the form of a white solid.

(1-2-5) Synthesis of trans-4-(trans-4-vinylcyclohexyl)cyclohexylmethyl methanesulfonate 15.1 g of trans-4-(trans-4-vinylcyclohexyl)cyclohexylmethanol, 8.2 mL of pyridine, and 0.41 g of 4-dimethylaminopyridine were dissolved in 50 mL of dichloromethane. A dichloromethane (6 mL) solution containing 6.3 mL of methanesulfonyl chloride was added dropwise to the above solution on ice for 30 minutes. The solution was heated to room temperature, then stirred for 6 hours, and was left over night. The reaction solution was poured into 10% hydrochloric acid, and the organic phase was fractioned. The water phase was extracted with dichloromethane. The organic phase was collected and washed with saturated saline, and then dried over anhydrous magnesium sulfate. The solvent was evaporated under reduced pressure. The residue was purified by column chromatography (silicagel/toluene) and recrystallization (hexane/toluene) three times, to thereby obtain 9.8 g of trans-4-(trans-4-vinylcyclohexyl)cyclohexylmethyl methanesulfonate in the form of colorless crystals.

(1-2-6) Synthesis of 1-((E)-2-butenoxy)-2,3-difluoro-4-(trans-4-(trans-4-vinylcyclohexyl)cyclohexyl)methoxy benzene (1a)

10.4 g of trans-4-(trans-4-vinylcyclohexyl)cyclohexylmethyl methanesulfonate and 7.3 g of 4-(2-butenoxy)-2,3-difluorophenol obtained in (1-1) were dissolved in 90 mL of DMF. 11.0 g tripotassium phosphate was added thereto, and the solution was stirred for 3 hours at 100 to 130° C. Then, 9 g of 4-(2-butenoxy)-2,3-difluorophenol was added, and the solution was further stirred for 3 hours. The reaction mixture was poured into water, and extraction was performed with toluene. The resultant product was washed with water and saturated saline in this order, and then dried over anhydrous magnesium sulfate. The solvent was evaporated under reduced pressure. The residue was purified by column chromatography and recrystallization, to thereby obtain 4.0 g of 1-((E)-2-butenoxy)-2,3-difluoro-4-(trans-4-(trans-4-vinylcyclohexyl)cyclohexyl)methoxy benzene (1a) in the form of colorless crystals.

phase transition temperature: C 71.0 N 137.9 I (C, N, and I respectively represent a crystal phase, a nematic phase, and an isotropic phase, which are the same hereinunder.)

$^1$H-NMR (400 MHz, CDCl$_3$)

δ: 0.95-1.15 (m, 10H), 1.65-2.00 (m, 13H), 3.76 (d, J=6.4 Hz, 2H), 4.46 (dt, J=6.4 Hz, J=0.8 Hz, 2H), 4.87 (ddd, J=10.4 Hz, J=1.6 Hz, J=0.8 Hz, 1H), 4.95 (dt, J=17.2 Hz, J=1.6 Hz, 1H), 5.65-5.90 (m, 3H), 6.55-6.65 (m, 2H)

Example 2

Synthesis of 2,3-difluoro-1-(2-propenyloxy)-4-(trans-4-vinylcyclohexylmethoxy)benzene (2a)

(2-1) Synthesis of 4-(2-propenoxy)-2,3-difluorophenol

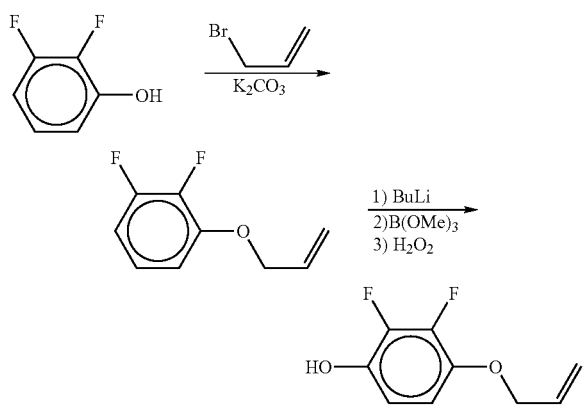

The same procedure as that of (1-1) in example 1 was performed except that 3-bromo-1-propene was used instead of 1-bromo-2-butene, to thereby obtain 4-(2-propenoxy)-2,3-difluorophenol.

(2-2) Synthesis of 2,3-difluoro-1-(2-propenyloxy)-4-(trans-4-vinylcyclohexylmethoxy)benzene

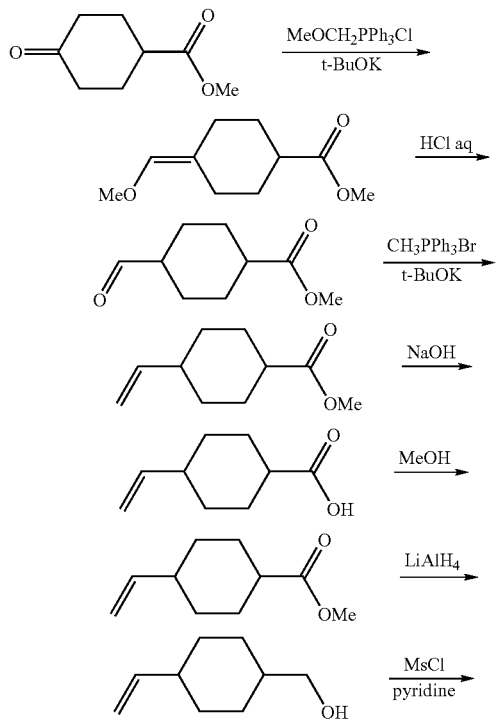

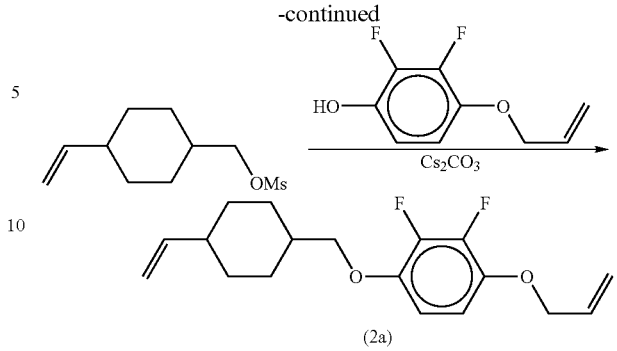

(2-2-1) Synthesis of methyl 4-methoxymethylidene-cyclohexane-carboxylate 263.4 g of methoxymethyl triphenylphosphonium chloride was dispersed in 750 mL of tetrahydrofuran, to which 86.2 g of potassium-t-butoxide was added at −9 to −4° C. for 5 minutes. The solution was further stirred at −4 to −11° C. for 30 minutes. Then, 100.0 g of methyl 4-oxocyclohexane-carboxylate was dissolved in 300 mL of THF, which was added dropwise to the above solution at −10 to 4° C. for 80 minutes. The solution was further stirred at 0 to 4° C. for 60 minutes, and then 7.0 g of ammonium chloride and 20 mL of water were added thereto. The solvent of the reaction mixture was evaporated under reduced pressure. Then, 600 mL of hexane was added and the solution was stirred under room temperature for 30 minutes. The precipitate was filtered off. Then, the precipitate was again suspended and washed with 600 mL of hexane, combined with the hexane filtrate, and washed with a mixed solution of methanol-water (1:1), water, and saturated saline in this order. The resultant product was dried over anhydrous sodium sulfate. Then, the solvent was evaporated under reduced pressure, to obtain 103 g of methyl 4-methoxymethylidene-cyclohexane-carboxylate in the form of an oil-like product.

(2-2-2) Synthesis of methyl 4-formylcyclohexane-carboxylate 103 g of methyl 4-methoxymethylidene-cyclohexane-carboxylate was dissolved in 350 mL of THF, to which 100 mL of 10% hydrochloric acid was added dropwise at 11 to 13° C. for 10 minutes. The solution was further stirred at room temperature for 3 hours, and then 80 mL of hexane was added. The water phase was extracted with ethyl acetate, and then the organic phases were combined and washed with water and saturated saline in this order. The resultant product was dried over anhydrous magnesium sulfate, and then concentrated, to obtain 92.4 g of methyl 4-formylcyclohexane-carboxylate in the form of an oil-like product. The obtained product was analyzed by gas chromatography, and was found to be a mixture of cis-form: trans-form at a ratio of 64:36.

(2-2-3) Synthesis of methyl 4-vinylcyclohexane carboxylate 297.4 g of methyl triphenylphosphonium bromide was dispersed in 900 mL of THF, to which 95.6 g of potassium-t-butoxide was added at −8° C. for 3 minutes. The solution was further stirred for 30 minutes, and then 92.4 g of methyl 4-formylcyclohexane-carboxylate was dissolved in 270 mL of THF, which was added dropwise to the above solution at −6 to 4° C. for 50 minutes. The solution was further stirred at 0 to 4° C. for 30 minutes, and then 15 mL of water was added thereto. The solvent of the reaction mixture was evaporated under reduced pressure. Then, 500 mL of hexane was added and the solution was stirred under room temperature for 30 minutes. The precipitate was filtered off. Then, the precipitate was again suspended and washed with 500 mL of hexane, combined with the hexane filtrate, and washed with a mixed solution of methanol-water (1:1), water, and saturated saline in this order. The resultant product was dried over anhydrous sodium sulfate. Then, the solvent was evaporated under reduced pressure, to obtain 81.2 g of an oil-like product. 57.3 g of methyl 4-vinylcyclohexane-carboxylate was obtained by distillation under reduced pressure.

boiling point: 122 to 127° C./48 hPa

The obtained product was analyzed by gas chromatography, and was found to be a mixture of cis-form: transform at a ratio of 26:74.

(2-2-4) Synthesis of trans-4-vinylcyclohexane carboxylic acid 55.3 g of methyl 4-vinylcyclohexane-carboxylate was dissolved in 60 mL of methanol, and was cooled to 15° C. Then, 100 g of 20% sodium hydroxide aqueous solution was added thereto. The solution was further stirred at room temperature for 2 hours, and then concentrated hydrochloric acid was added to make the system acidic. Extraction was performed with hexane, and then the organic phase was washed with saturated saline. The resultant product was dried over anhydrous sodium sulfate, and concentrated, to obtain 52.4 g of reaction mixture. 23.0 g of trans-4-vinylcyclohexane carboxylic acid was obtained by recrystallization from hexane.

(2-2-5) Synthesis of methyl trans-4-vinylcyclohexane carboxylate 23.0 g of trans-4-vinylcyclohexane carboxylic acid was dissolved in 120 mL of methanol, and added with 0.1 g of trimethylsilylchloride, which was then subjected to reflux for 6 hours. Then, the resultant product was cooled to room temperature and concentrated under reduced pressure. 150 mL of hexane was added thereto, and the methanol phase was separated. Then, the methanol phase was extracted with hexane, and the organic phases were combined and washed with saturated saline. The resultant product was dried over anhydrous sodium sulfate, and then concentrated, to obtain 29.5 g of methyl trans-4-vinylcyclohexane carboxylate in the form of an oil-like product.

(2-2-6) Synthesis of (trans-4-vinylcyclohexyl)methanol 5.7 g of lithium aluminium hydride was dispersed in 50 mL of THF. 29.5 g of methyl trans-4-vinylcyclohexane carboxylate was dissolved in 75 mL of THF, which was added dropwise to the above solution at 15 to 16° C. for 40 minutes. The solution was further stirred at 10 to 20° C. for 30 minutes, and then water was slowly added thereto. About 70 mL of 10% hydrochloric acid was added. While washing and rinsing with hexane, a sludge-like insoluble matter was removed by a decanter. Then, the obtained organic phase was washed with 10% hydrochloric acid, saturated sodium bicarbonate water, and saturated saline, in this order. The resultant product was dried over anhydrous sodium sulfate, and concentrated, to obtain 26 g of (trans-4-vinylcyclohexyl)methanol.

(2-2-7) Synthesis of (trans-4-vinylcyclohexyl)methyl methanesulfonate 26 g of (trans-4-vinylcyclohexyl)methanol was dissolved in 100 mL of dichloromethane, and was added with 23.6 g of pyridine and 0.9 g of 4-dimethylaminopyridine. 18.8 g of methanesulfonyl chloride was dissolved in 36 mL of dichloromethane, which was added dropwise to the above solution at 14 to 20° C. for 25 minutes. The solution was further stirred at room temperature for 7 hours, and was then left over night. 40 mL of water was added thereto, and the organic phase was separated. Then, the organic phase was washed with 10% hydrochloric acid, water, saturated sodium bicarbonate water, and saturated aqueous solution of ammonium chloride, in this order. The resultant product was dried over anhydrous magnesium sulfate, and concentrated, to obtain 32.7 g of a solid product. 30.8 g of (trans-4-vinylcyclohexyl)methyl methanesulfonate was obtained by recrystallization from hexane.

(2-2-8) Synthesis of 2,3-difluoro-1-(2-propenoxy)-4-(trans-4-vinylcyclohexylmethoxy)benzene (2a)

32.8 g of anhydrous cesium carbonate was added to DMF (150 mL) solution containing 19.5 g of 4-(2-propenoxy)-2,3-difluorophenol obtained in (2-1), and then DMF (70 mL) solution containing 17.5 g of (trans-4-vinylcyclohexyl)methyl methanesulfonate was added thereto. The solution was heated at 80° C. for 24 hours, then cooled to room temperature, and water was added dropwise thereto to stop the reaction. Extraction was performed with toluene (three times), and the collected organic phase was washed with 3M hydrochloric acid, water, saturated aqueous solution of sodium hydrogencarbonate, and saturated saline in this order, and was dried over anhydrous magnesium sulfate. The solvent was evaporation. The residue was purified by column chromatography and recrystallization (methanol), to thereby obtain 13.1 g of 2,3-difluoro-1-(2-propenoxy)-4-(trans-4-vinylcyclohexylmethoxy)benzene (2a) in the form of a colorless and transparent liquid.

melting point: 27.3° C.

MS: m/z: 308 (M$^+$), 186 (100)

$^1$H-NMR (400 MHz, CDCl$_3$)

δ: 1.00-1.25 (m, 4H), 1.70-2.00 (m, 6H), 3.78 (d, J=6.4 Hz, 2H), 4.55 (dt, J=5.6 Hz, J=1.2 Hz, 2H), 4.91 (dt, J=10.0 Hz, J=1.6 Hz, 1H), 4.98 (dt, J=17.2 Hz, J=1.6 Hz, 1H), 5.29 (dq, J=10.4 Hz, J=1.2 Hz, 1H), 5.40 (dq, J=17.2 Hz, J=1.6 Hz, 1H), 5.79 (ddd, J=17.2 Hz, J=10.4 Hz, J=6.4 Hz, 1H), 6.04 (ddd, J=22.8 Hz, J=10.8 Hz, J=5.6 Hz, 1H), 6.55-6.70 (m, 2H)

Example 3

Synthesis of 1-(3-butenoxy)-2,3-difluoro-4-(trans-4-vinylcyclohexyl)methoxybenzene (3a)

(3a)

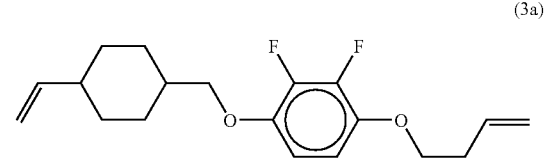

(3-1) Synthesis of 4-(3-butenoxy)-2,3-difluorophenol

The same procedure as that of (1-1) in example 1 was performed except that 4-bromo-1-butene was used instead of 1-bromo-2-butene, to thereby obtain 4-(3-butenoxy)-2,3-difluorophenol.

(3-2) Synthesis of 1-(3-butenoxy)-2,3-difluoro-4-(trans-4-vinylcyclohexyl)methoxybenzene (3a)

The same procedure as that of (2-2-8) in example 2 was performed except that 4-(3-butenoxy)-2,3-difluorophenol was used instead of 4-(2-propenoxy)-2,3-difluorophenol, to thereby obtain 1-(3-butenoxy)-2,3-difluoro-4-(trans-4-vinylcyclohexyl)methoxybenzene (3a).

melting point: 24° C.

MS:m/z: 322 (M$^+$), 55 (100)

$^1$H-NMR (400 MHz, CDCl$_3$)

δ: 1.00-1.25 (m, 4H), 1.70-2.05 (m, 6H), 2.54 (q, J=6.8 Hz, 2H), 3.78 (d, J=6.4 Hz, 2H), 4.03 (t, J=6.8 Hz, 2H), 4.94 (dd, J=34.0 Hz, J=17.2 Hz, 2H), 5.14 (dd, J=24.4 Hz, J=10.0 Hz, 2H), 5.79 (ddd, J=17.6 Hz, J=10.4 Hz, J=6.4 Hz, 1H), 5.85-6.00 (m, 1H), 6.55-6.70 (m, 2H)

Example 4

Synthesis of 2,3-difluoro-1-(4-pentenoxy)-4-(trans-4-vinylcyclohexyl)methoxybenzene (4a)

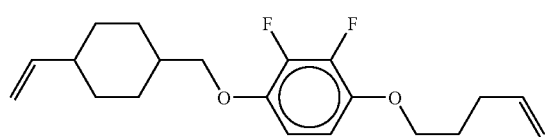

(4a)

(4-1) Synthesis of 4-(4-pentenoxy)-2,3-difluorophenol

The same procedure as that of (1-1) in example 1 was performed except that 5-bromo-1-pentene was used instead of 1-bromo-2-butene, to thereby obtain 4-(4-pentenoxy)-2,3-difluorophenol.

(4-2) Synthesis of 2,3-difluoro-1-(4-pentenoxy)-4-(trans-4-vinylcyclohexyl)methoxybenzene (4a)

The same procedure as that of (2-2-8) in example 2 was performed except that 4-(4-pentenoxy)-2,3-difluorophenol was used instead of 4-(2-propenoxy)-2,3-difluorophenol to thereby obtain 2,3-difluoro-1-(4-pentenoxy)-4-(trans-4-vinylcyclohexyl)methoxybenzene (4a), melting point: −17° C.

MS: m/z: 336 (M$^+$), 146 (100)

$^1$H-NMR (400 MHz, CDCl$_3$)

δ: 1.00-1.25 (m, 4H), 1.70-2.05 (m, 81H), 2.24 (q, J=6.8 Hz, 2H), 3.78 (d, J=6.4 Hz, 2H), 3.99 (t, J=6.4 Hz, 2H), 4.85-5.15 (m, 4H), 5.70-5.90 (m, 2H), 6.50-6.70 (m, 2H)

Example 5

Synthesis of 2,3-difluoro-1-(2-propenoxy)-4-(trans,trans-4-vinylbicyclohexyl-4'yl)methoxybenzene (5a)

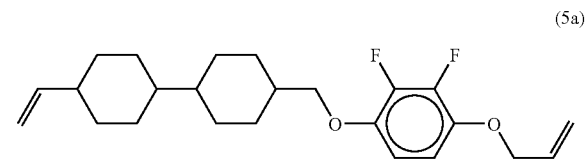

(5a)

The same procedure as that of (1-2-6) in example 1 was performed except that 4-(2-propenoxy)-2,3-difluorophenol was used instead of 4-(2-butenoxy)-2,3-difluorophenol, to thereby obtain 2,3-difluoro-1-(2-propenoxy)-4-(trans, trans-4-vinylbicyclohexyl-4'yl)methoxybenzene (5a).

phase transition temperature: C 47 N 127 I

MS m/z: 390 (M$^+$), 186 (100)

$^1$H-NMR (400 MHz, CDCl$_3$)

δ: 0.40-0.60 (m, 110H), 1.10-1.28 (m, 7H), 1.28-1.45 (m, 3H), 3.25 (d, J=6.4 Hz, 2H), 4.03 (d, J=5.6 Hz, 2H), 4.36 (dt, J=2.0 Hz, 10.8 Hz, 1H), 4.45 (dt, J=2.0 Hz, 17.6 Hz, 1H), 4.78 (dd, J=1.2 Hz, 10.4 Hz, 1H), 4.88 (d, J=1.4 Hz, 17.2 Hz, 1H), 5.26 (ddd, J=6.4 Hz, 10.4 Hz, 17.2 Hz, 1H), 5.53 (ddd, J=5.2 Hz, 12.0 Hz, 16.0 Hz, 1H), 6.06-6.14 (m, 2H)

Example 6

Synthesis of 1-((E)-2-butenoxy)-2,3-difluoro-4-(trans-4-vinylcyclohexyl)methoxybenzene (6a)

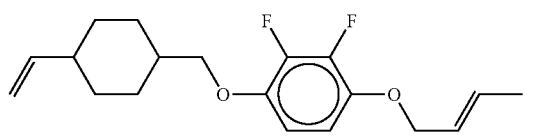

(6a)

The same procedure as that of (2-2-8) in example 2 was performed except that 4-(2-butenoxy)-2,3-difluorophenol was used instead of 4-(2-propenoxy)-2,3-difluorophenol, to thereby obtain 1-((E)-2-butenoxy)-2,3-difluoro-4-(trans-4-vinylcyclohexyl)methoxybenzene (6a).

melting point 37.5° C.

MS m/z: 322 (M$^+$), 146 (100)

$^1$H-NMR (400 MHz, CDCl$_3$)

δ: 1.00-1.25 (m, 4H), 1.70-2.00 (m, 9H), 3.78 (d, J=6.4 Hz, 2H), 4.46 (d, J=6.4 Hz, 2H), 4.94 (dd, J=34 Hz, J=10.4 Hz, 2H), 5.65-5.90 (m, 3H), 6.50-6.60 (m, 2H)

Example 7

Synthesis of 2,3-difluoro-1-(3-butenoxy)-4-(trans, trans-4-vinylbicyclohexyl-4'yl)methoxybenzene (7a)

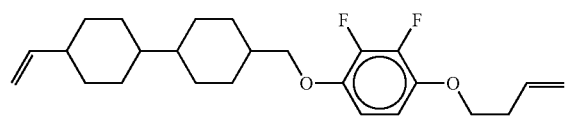

(7a)

The same procedure as that of (1-2-6) in example 1 was performed except that 4-(3-butenoxy)-2,3-difluorophenol was used instead of 4-(2-butenoxy)-2,3-difluorophenol, to thereby obtain 2,3-difluoro-1-(3-butenoxy)-4-(trans, trans-4-vinylbicyclohexyl-4'yl)methoxybenzene (7a).

phase transition temperature: C 64.5 N 119.5 I
MS m/z: 404 (M$^+$), 55 (100)
$^1$H-NMR (400 MHz, CDCl$_3$)
δ: 0.95-1.15 (m, 10H), 1.65-2.00 (m, 10H), 2.50-2.60 (m, 2H), 3.76 (d, J=6.4 Hz, 2H), 4.03 (t, J=6.8 Hz, 2H), 4.80-5.30 (m, 4H), 5.79 (ddd, J=17.2 Hz, J=10.4 Hz, J=6.4 Hz, 1H), 5.83-5.95 (m, 1H), 6.55-6.70 (m, 2H)

Example 8

Synthesis of 2,3-difluoro-1-(4-pentenoxy)-4-(trans, trans-4-vinylbicyclohexyl-4'yl)methoxybenzene (8a)

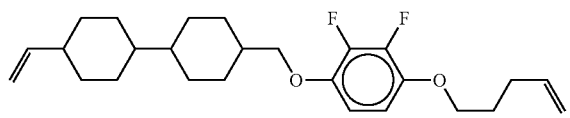

(8a)

The same procedure as that of (1-2-6) in example 1 was performed except that 4-(4-pentenoxy)-2,3-difluorophenol was used instead of 4-(2-butenoxy)-2,3-difluorophenol, to thereby obtain 2,3-difluoro-1-(4-pentenoxy)-4-(trans,trans-4-vinylbicyclohexyl-4'yl)methoxybenzene (8a).

phase transition temperature: C 37 (S 36) N 123 I
(S represents a smectic phase.)
MS m/z: 418 (M$^+$), 146 (100)
$^1$H-NMR (400 MHz, CDCl$_3$)
δ: 0.95-1.15 (m, 10H), 1.65-2.00 (m, 12H), 2.20-2.30 (m, 2H), 3.76 (d, J=6.4 Hz, 2H), 3.98 (t, J=6.8 Hz, 2H), 4.85-5.10 (m, 4H), 5.77 (ddd, J=17.2 Hz, J=10.4 Hz, J=6.4 Hz, 1H), 5.75-5.90 (m, 1H), 6.55-6.65 (m, 2H)

Example 9

Preparation of Liquid Crystal Composition (1)

A host liquid crystal composition (H) including the following composition:

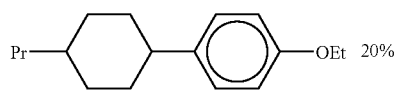 20%

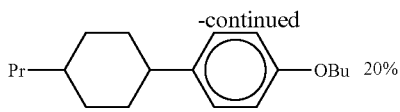 20%

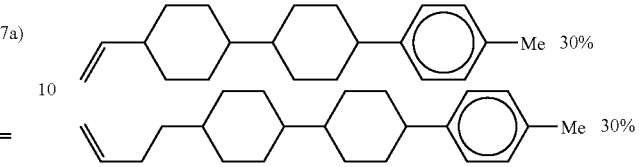

(H)

was prepared. Here, the physical properties of (H) are as follows.

nematic phase upper limit temperature (TN-I): 103.2° C.
dielectric constant anisotropy (Δ∈): 0.03
refractive index anisotropy (Δn): 0.099
viscosity (mPa·s): 15.2

A liquid crystal composition (M-1) including 80% of the host liquid crystal (H) and 20% of (1a) obtained in example 1 was prepared. The physical properties of this composition are as follows.

nematic phase upper limit temperature (TN-I): 109.6° C.
dielectric constant anisotropy (Δ∈): −1.19
refractive index anisotropy (Δn): 0.102
viscosity (mPa·s): 19.6

The liquid crystal composition (M-1) including the compound (1a) of the present invention showed a higher nematic phase upper limit temperature (N-A), and a lower and negative dielectric constant anisotropy (Δ∈), compared to the host liquid crystal (H). From this result, it is understood that the compound (1a) of the present invention stably shows a nematic phase even at a high temperature, with a negative dielectric constant anisotropy of a very large absolute value.

Example 10

Preparation of Liquid Crystal Composition (2)

A liquid crystal composition (M-2) including 80% of the host liquid crystal (A) prepared in example 9 and 20% of (5a) obtained in example 5 was prepared. The physical properties of this composition are as follows.

nematic phase upper limit temperature (TN-I): 106.4° C.
dielectric constant anisotropy (Δ∈): −1.14
refractive index anisotropy (Δn): 0.100
viscosity (mPa·s): 18.6

The liquid crystal composition (M-2) including the compound (2a) of the present invention showed a higher nematic phase upper limit temperature (TN-I), and a lower and negative dielectric constant anisotropy (Δ∈), compared to the host liquid crystal (H). From this result, it is understood that the compound (2a) of the present invention stably shows a nematic phase even at a high temperature, with a negative dielectric constant anisotropy of a very large absolute value.

Example 11

Preparation of Liquid Crystal Composition (3)

A liquid crystal composition (M-3) including 80% of the host liquid crystal (H) prepared in example 9 and 20% of (7a) obtained in example 7 was prepared. The physical properties of this composition are as follows.

nematic phase upper limit temperature (TN-I): 105.4° C.
dielectric constant anisotropy (Δ∈): −1.11
refractive index anisotropy (Δn): 0.099
viscosity (mPa·s): 18.8

The liquid crystal composition (M−3) including the compound (3a) of the present invention showed a higher nematic phase upper limit temperature (TN-I), and a lower and negative dielectric constant anisotropy (Δ∈), compared to the host liquid crystal (H). From this result, it is understood that the compound (3a) of the present invention stably shows a nematic phase even at a high temperature, with a negative dielectric constant anisotropy of a very large absolute value.

Example 12

Preparation of Liquid Crystal Composition (4)

A liquid crystal composition (M−4) including 80% of the host liquid crystal (H) prepared in example 9 and 20% of (8a) obtained in example 8 was prepared. The physical properties of this composition are as follows.
nematic phase upper limit temperature (TN-I): 106.6° C.
dielectric constant anisotropy (Δ∈): −1.07
refractive index anisotropy (Δn): 0.099
viscosity (mPa·s): 18.8

The liquid crystal composition (M−8) including the compound (8a) of the present invention showed a higher nematic phase upper limit temperature (TN-I), and a lower and negative dielectric constant anisotropy (Δ∈), compared to the host liquid crystal (H). From this result, it is understood that the compound (8a) of the present invention stably shows a nematic phase even at a high temperature, with a negative dielectric constant anisotropy of a very large absolute value.

Comparative Example 1

Preparation of Liquid Crystal Composition (5)

A liquid crystal composition (M−5) including 80% of the host liquid crystal (H) prepared in example 9 and 20% of compound (1b):

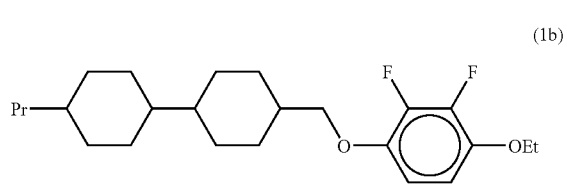

described in Patent Document 1 was prepared. The physical properties of this composition are as follows.
nematic phase upper limit temperature (TN-I): 112.6° C.
dielectric constant anisotropy (Δ∈): −1.20
refractive index anisotropy (Δn): 0.099 viscosity (mPa·s): 20.4

The liquid crystal composition (M−5) including the compound (1b) described in Patent Document 1 showed a higher viscosity, compared to (M−1) to (M−4) described in example 9 through example 12. From this result, it is understood that the compound (1b) described in Patent Document 1 has a higher viscosity compared to those of the compounds (1a), (5a), (7a), and (8a) of the present invention.

Example 13

Preparation of Liquid Crystal Composition (6)

A liquid crystal composition (M−6) including 80% of the host liquid crystal (H) prepared in example 9 and 20% of (2a) obtained in example 2 was prepared. The physical properties of this composition are as follows.
nematic phase upper limit temperature (TN-I): 75.2° C.
dielectric constant anisotropy (Δ∈): −1.33
refractive index anisotropy (Δn): 0.094
viscosity (mPa·s): 14.3

The liquid crystal composition (M−6) including the compound (2a) of the present invention showed a much lower and negative dielectric constant anisotropy (Δ∈), and a lower viscosity, compared to the host liquid crystal (H). From this result, it is understood that the compound (2a) of the present invention has a negative dielectric constant anisotropy of a very large absolute value, and a very low viscosity.

Example 14

Preparation of Liquid Crystal Composition (7)

A liquid crystal composition (M−7) including 80% of the host liquid crystal (H) prepared in example 9 and 20% of (3a) obtained in example 3 was prepared. The physical properties of this composition are as follows.
nematic phase upper limit temperature (TN-I): 73.3° C.
dielectric constant anisotropy (Δ∈): −1.18
refractive index anisotropy (Δn): 0.092
viscosity (mPa·s): 15.5

The liquid crystal composition (M−7) including the compound (3a) of the present invention showed a much lower and negative dielectric constant anisotropy (Δ∈), and an approximately equivalent viscosity, compared to the host liquid crystal (H) From this result, it is understood that the compound (3a) of the present invention has a negative dielectric constant anisotropy of a very large absolute value, and a low viscosity.

Example 15

Preparation of Liquid Crystal Composition (8)

A liquid crystal composition (M−8) including 80% of the host liquid crystal (H) prepared in example 9 and 20% of (4a) obtained in example 4 was prepared. The physical properties of this composition are as follows.
nematic phase upper limit temperature (TN-I): 74.4° C.
dielectric constant anisotropy (Δ∈): −1.19
refractive index anisotropy (Δn): 0.092
viscosity (mPa·s): 15.8

The liquid crystal composition (M−8) including the compound (4a) of the present invention showed a much lower and negative dielectric constant anisotropy (Δ∈), and an approximately equivalent viscosity, compared to the host liquid crystal (H). From this result, it is understood that the compound (4a) of the present invention has a negative dielectric constant anisotropy of a very large absolute value, and a low viscosity.

Example 16

Preparation of Liquid Crystal Composition (9)

A liquid crystal composition (M−9) including 80% of the host liquid crystal (H) prepared in example 9 and 20% of (6a)

obtained in example 6 was prepared. The physical properties of this composition are as follows.

nematic phase upper limit temperature (TN-I): 78.2° C.
dielectric constant anisotropy (Δ∈): −1.39
refractive index anisotropy (Δn): 0.097
viscosity (mPa·s): 15.4

The liquid crystal composition (M−9) including the compound (6a) of the present invention showed a much lower and negative dielectric constant anisotropy (Δ∈), and an approximately equivalent viscosity, compared to the host liquid crystal (H). From this result, it is understood that the compound (6a) of the present invention had a negative dielectric constant anisotropy of a very large absolute value, and a low viscosity.

Comparative Example 2

Preparation of Liquid Crystal Composition (10)

A liquid crystal composition (M−10) including 80% of the host liquid crystal (H) prepared in example 9 and 20% of compound (2b):

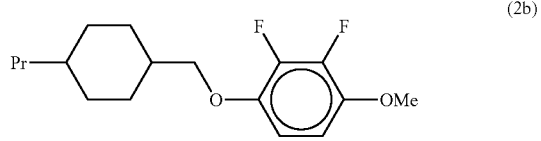
(2b)

described in Patent Document 1 was prepared. The physical properties of this composition are as follows.

nematic phase upper limit temperature (TN-1): 77.7° C.
dielectric constant anisotropy (Δ∈): −1.34
refractive index anisotropy (Δn): 0.092
viscosity (mPa·s): 16.6

The liquid crystal composition (M−10) including the compound (2b) described in Patent Document 1 showed a higher viscosity, compared to (M−6) to (M−9) described in example 13 to example 16. From this result, it is understood that the compound (2b) described in Patent Document 1 has a higher viscosity compared to those of the compounds (2a), (3a), (4a), and (6a) of the present invention.

Example 17

A liquid crystal composition (No. 1) represented by the following structures was prepared using the compounds produced in examples 1 and 6, and the physical properties thereof were measured.

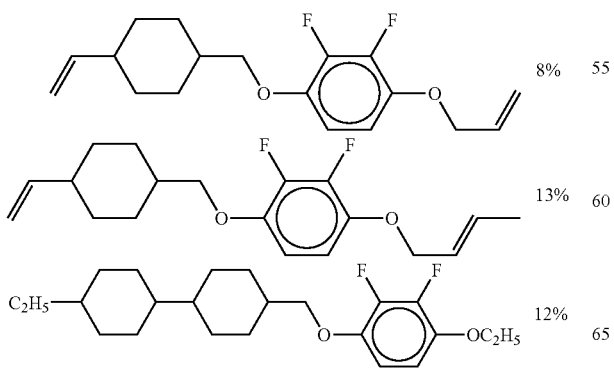

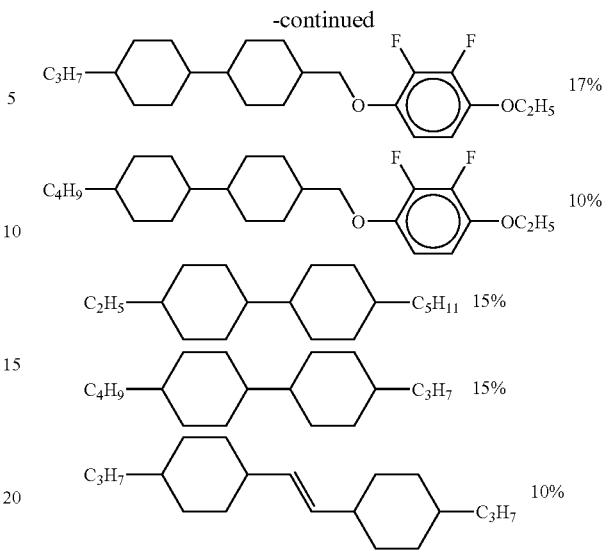

The properties of (No. 1) were such that Tni: 78.9° C., Δn: 0.074, Δ∈: −4.7, and η: 22.1 mPa·s.

Example 18

A liquid crystal composition (No. 2) represented by the following structures was prepared, and the physical properties thereof were measured.

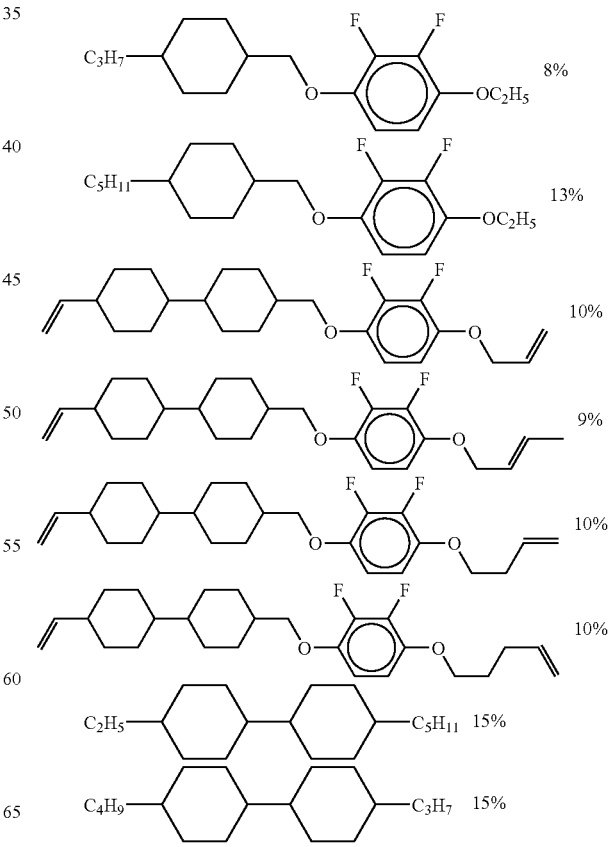

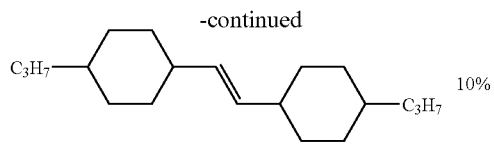
-continued

The properties of (No. 2) were such that Tni: 79.2° C., Δn: 0.075, Δ∈: −4.6, and η: 22.0 mPa·s.

Comparative Example 3

As comparative example 3, a liquid crystal composition (R−1) represented by the following structures which did not contain a compound represented by general formula (I) was prepared, and the physical properties thereof were measured.

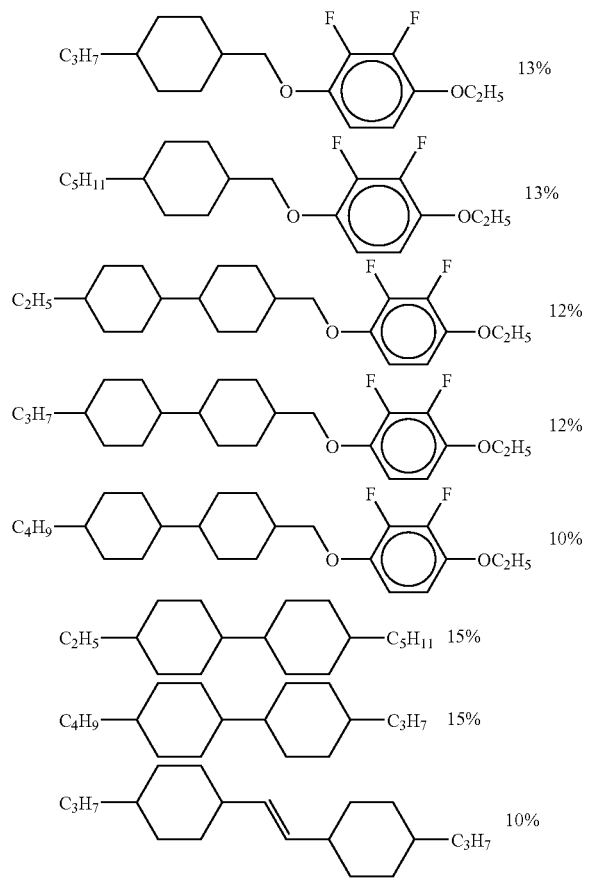

The properties of (No. 3) were such that Tni: 77.5° C., Δn: 0.073, Δ∈: −4.8, and η: 23.5 mPa·s.

These properties are summarized in Table 1.

TABLE 1

Examples 17 and 18, and Comparative Example 3

|  | No. 1 | No. 2 | R-1 |
| --- | --- | --- | --- |
| (I) (%) | 21 | 39 | — |
| (II) (%) | 40 | 40 | 40 |
| (III) (%) | 39 | 21 | 60 |
| $T_{N-1}$ (° C.) | 78.9 | 79.2 | 77.5 |

TABLE 1-continued

Examples 17 and 18, and Comparative Example 3

|  | No. 1 | No. 2 | R-1 |
| --- | --- | --- | --- |
| Δn | 0.074 | 0.075 | 0.073 |
| Δ∈ | −4.7 | −4.6 | −4.8 |
| η (mPa · s) | 22.1 | 22.0 | 23.5 |

From Table 1, it is understood that, No. 1 and No. 2 are excellent liquid crystal compositions having approximately equivalent values of Δn and a negative Δ∈ of large absolute values, but slightly higher Tni, as compared to those of R−1, with low viscosities.

Example 19

A liquid crystal composition (No. 3) represented by the following structures was prepared, and the physical properties thereof were measured.

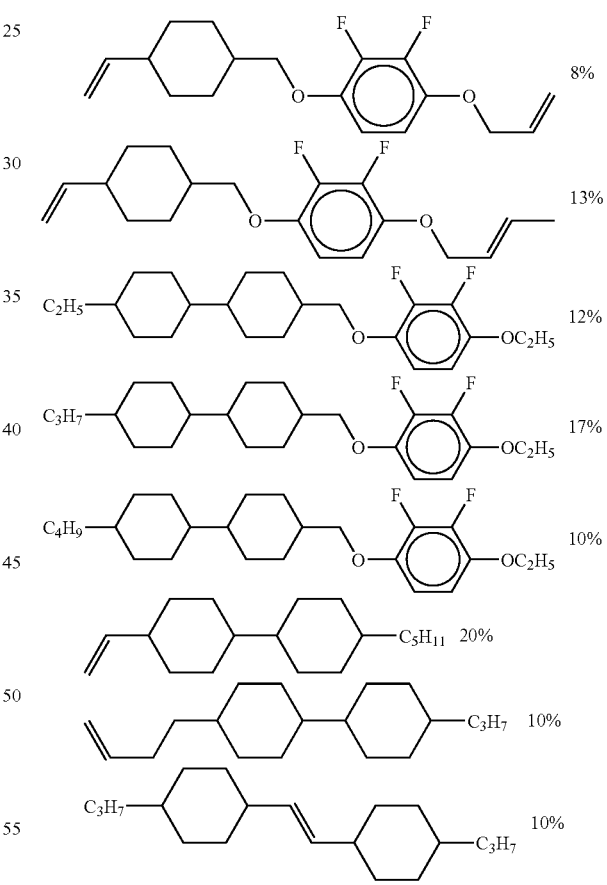

The properties of (No. 3) were such that Tni: 77.7° C., Δn: 0.075, Δ∈: −4.7, and η: 18.5 mPa·s.

Example 20

A liquid crystal composition (No. 4) represented by the following structures was prepared, and the physical properties thereof were measured.

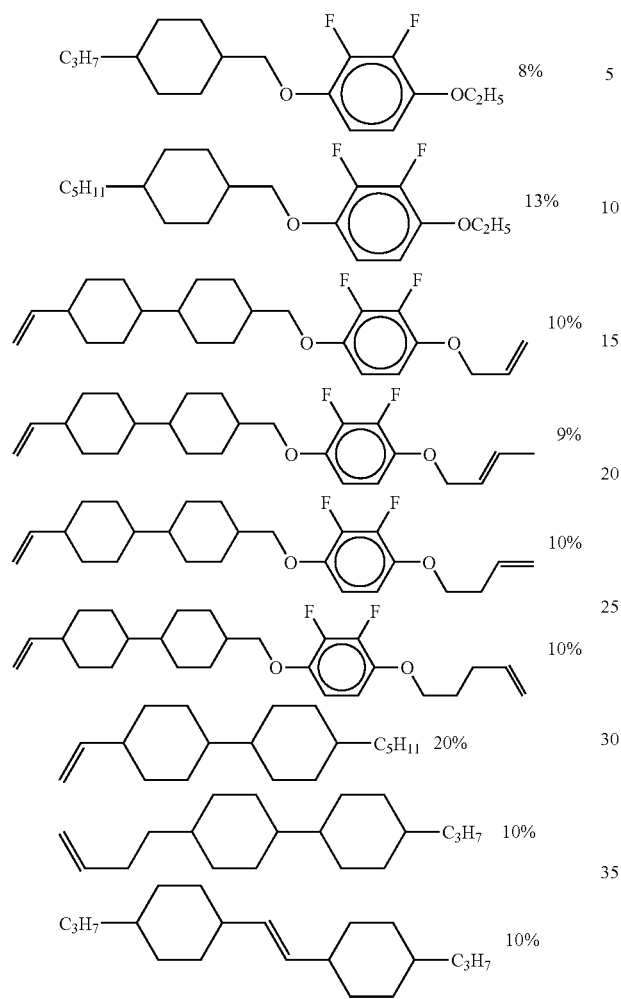

The properties of (No. 4) were such that Tni: 78.2° C., Δn: 0.075, Δ∈: −4.6, and η: 18.3 mPa·s.

Comparative Examples 4, 5, and 6

As comparative example 4, a liquid crystal composition (R-2) represented by the following structures, which did not contain the general formula (I), was prepared, and the physical properties thereof were measured.

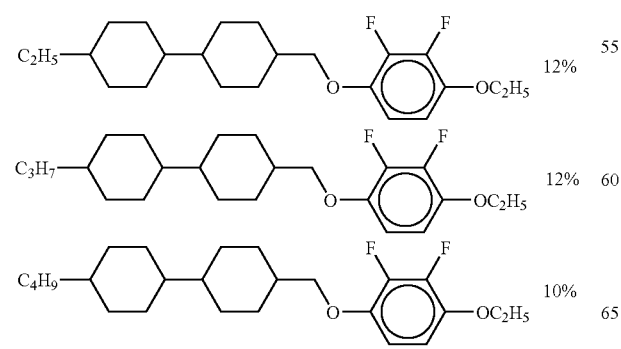

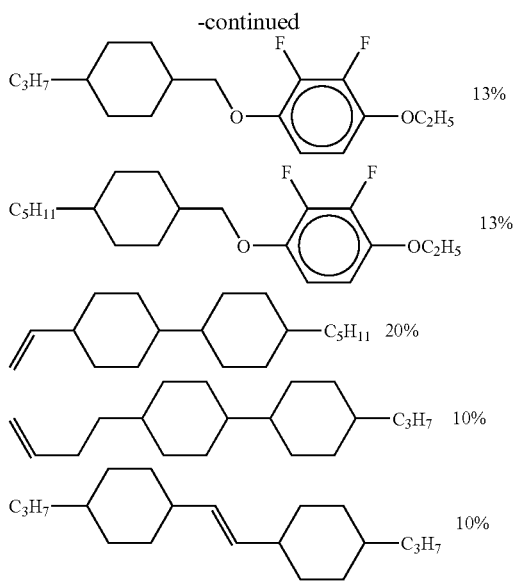

The properties of (R-2) were such that Tni: 76.3° C., Δn: 0.074, Δ∈: −4.8, and η: 20.0 mPa·s.

As comparative example 5, a liquid crystal composition (R-3) represented by the following structures which did not contain a compound represented by general formula (I) was prepared, and the physical properties thereof were measured.

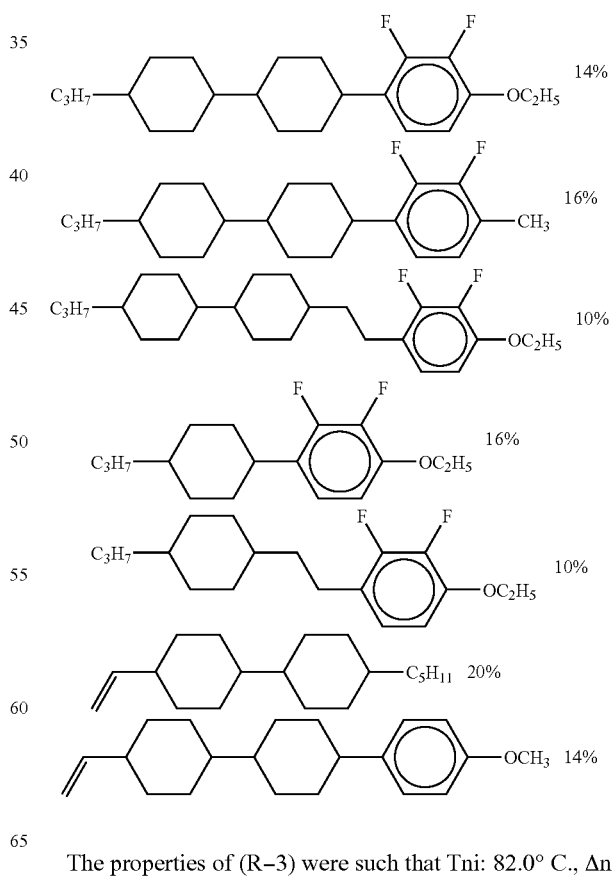

The properties of (R-3) were such that Tni: 82.0° C., Δn: 0.082, Δ∈: −2.5, and η: 22.3 mPa·s.

As comparative example 6, a liquid crystal composition (R-4) represented by the following structures which did not contain a compound represented by general formula (I) was prepared, and the physical properties thereof were measured.

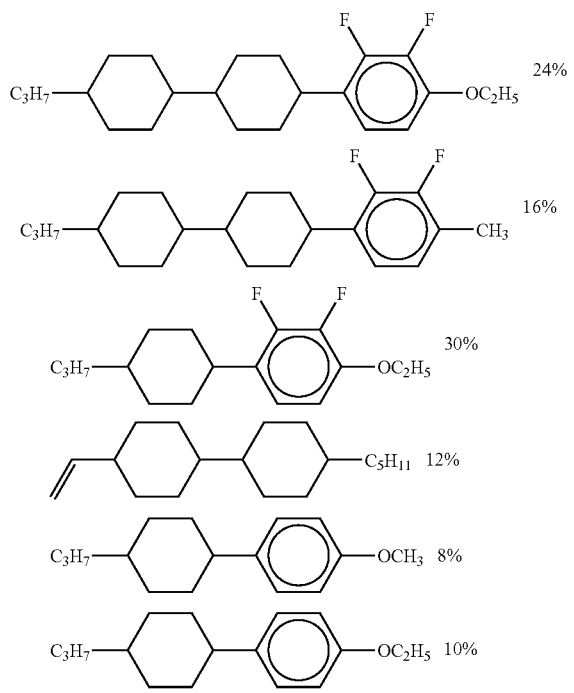

The properties of (R-4) were such that Tni: 49.5° C., Δn: 0.076, Δ: -3.0, and η: 23.1 mPa·s.

These properties are summarized in Table 2.

TABLE 2

Examples 19 and 20, and Comparative Examples 4, 5, and 6

|  | No. 3 | No. 4 | R-2 | R-3 | R-4 |
| --- | --- | --- | --- | --- | --- |
| (I) (%) | 21 | 39 | — | — | — |
| (II) (%) | 40 | 40 | 40 | 34 | 30 |
| (III) (%) | 39 | -21 | 60 | 66 | 70 |
| $T_{N-1}$ (° C.) | 77.7 | 78.2 | 76.3 | 82.0 | 49.5 |
| Δn | 0.075 | 0.075 | 0.074 | 0.082 | 0.076 |
| Δε | -4.7 | -4.6 | -4.8 | -2.5 | -3.0 |
| η (mPa·s) | 18.5 | 18.3 | 20.0 | 22.3 | 23.1 |

R-2 uses a compound in which the $R^2$ group of the compound represented by general formula (I) in No. 3 and No. 4 is substituted with an alkyl side chain. Comparing the physical properties of No. 3 and No. 4 with those of R-2, it is understood that R-2 has a higher viscosity and a slightly lower Tni.

On the other hand, R-3 is a liquid crystal composition that is often used for liquid crystal display elements at present, mainly including a compound having a negative Δ∈ without a linking group. R-3 has a Δ∈ of a small absolute value and a high viscosity. R-4 is a liquid crystal composition mainly including a compound having a negative Δ∈ without a linking group, and general formula (II) having an alkyl group, which has a greatly lower Tni in addition to the drawbacks of R-3.

Liquid crystal display devices of VA type were produced using liquid crystal compositions of No. 1 through No. 4, which showed excellent display quality.

INDUSTRIAL APPLICABILITY

The liquid crystal composition of the present invention is very useful as a component of liquid crystal displays of VA type, ECB type, IPS type, and the like.

The invention claimed is:

1. A nematic liquid crystal composition, comprising:
10 to 80% by mass of either one or at least two compounds represented by general formula (I) as a first component:

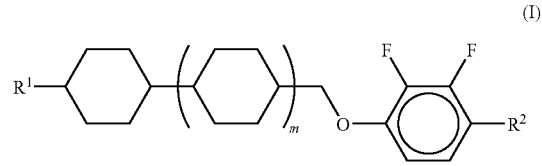

(wherein $R^1$ represents an alkenyl group of 2 to 10 carbon atoms, in which one $CH_2$ group, or at least two $CH_2$ groups that are not adjacent, may be substituted with O and/or S, and one or at least two hydrogen atoms may be substituted with F or Cl; $R^2$ represents an alkenyl group of 2 to 10 carbon atoms or an alkenyloxy group of 3 to 10 carbon atoms; and m represents 0, 1, or 2); and 20 to 70% by mass of either one or at least two compounds represented by general formula (II) as a second component:

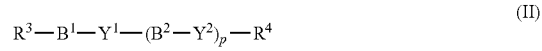

(wherein $R^3$ and $R^4$ each represent, independently, an alkyl group of 1 to 10 carbon atoms, an alkoxy group of 1 to 10 carbon atoms, an alkenyl group of 2 to 10 carbon atoms, or an alkenyloxy group of 3 to 10 carbon atoms;

$B^1$ and $B^2$ each represent, independently, a group selected from the group consisting of (a) a trans-1,4-cyclohexylene group (in which one $CH_2$ group, or at least two $CH_2$ groups that are not adjacent, may be substituted with an oxygen atom or a sulfur atom), (b) a 1,4-phenylene group (in which one or at least two CH groups may be substituted with a nitrogen atom), and (c) a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, and a 1,2,3,4-tetrahydronaphthalene-2,6-diyl group, in which a hydrogen atom of the above group (a), group (b), or group (c) may be substituted with CN or halogen;

$Y^1$ and $Y^2$ each represent, independently, —$CH_2CH_2$—, —CH=CH—, —CH($CH_3$)$CH_2$—, —$CH_2$CH($CH_3$)—, —CH($CH_3$)CH($CH_3$)—, —$CF_2CF_2$—, —CF=CF—, —$CH_2$O—, —O$CH_2$—, —OCH($CH_3$)—, —CH($CH_3$)O—, —($CH_2$)$_4$—, —($CH_2$)$_3$O—, —O($CH_2$)$_3$—, —C≡C—, —$CF_2$O—, —O$CF_2$—, —COO—, —OCO—, —COS—, —SCO—, or a single bond;

in the case where pluralities of $Y^2$ and $B^2$ exist, a plurality of $Y^2$ or $B^2$ may be the same or different; and p represents 0, 1, or 2), wherein
a dielectric constant anisotropy is negative.

2. The nematic liquid crystal composition according to claim 1, wherein at least one of $R^3$ and $R^4$ represents an alkenyl group in said general formula (II).

3. The nematic liquid crystal composition according to claim 1, comprising either one or at least two compounds selected from the group consisting of compounds represented by general formula (I-A) and general formula (I-B):

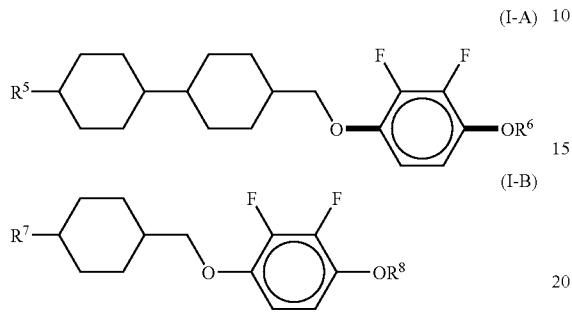

(wherein $R^5$ and $R^7$ each represent, independently, an alkenyl group of 2 to 10 carbon atoms, and $R^6$ and $R^8$ each represent, independently, an alkenyl group of 3 to 10 carbon atoms).

4. The nematic liquid crystal composition according to claim 1, comprising either one or at least two compounds selected from the group consisting of compounds represented by general formula (II-A) through general formula (II-G):

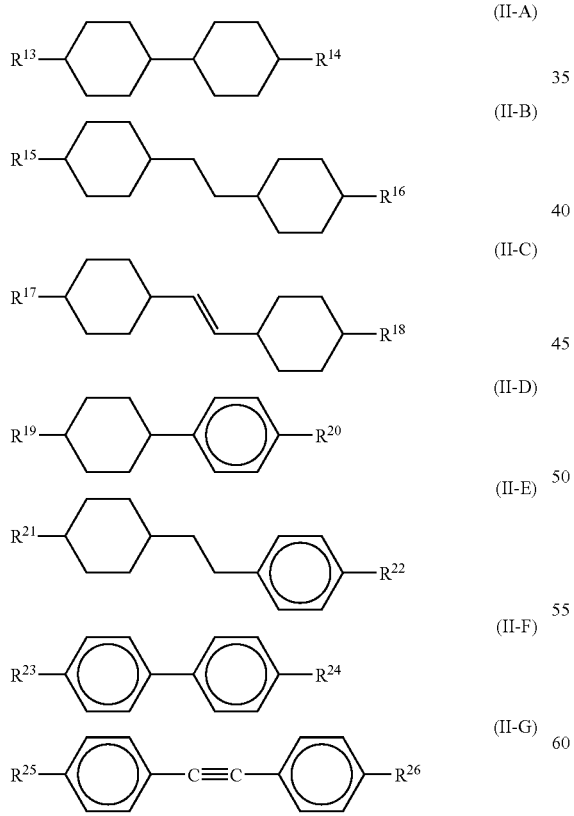

(wherein $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$ and $R^{26}$ each represent, independently, an alkyl group of 1 to 10 carbon atoms, an alkoxy group of 1 to 10 carbon atoms, an alkenyl group of 2 to 10 carbon atoms, or an alkenyloxy group of 3 to 10 carbon atoms).

5. The nematic liquid crystal composition according to claim 4, comprising:

either one or at least two compounds selected from the group consisting of compounds represented by general formula (I-A) and general formula (I-B):

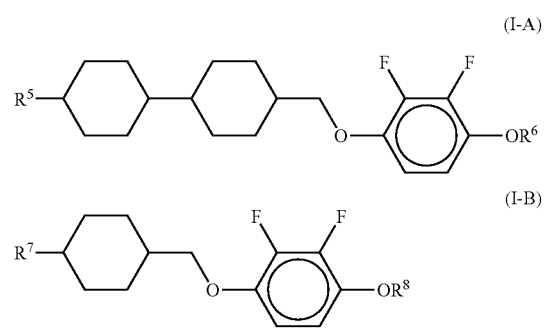

(wherein $R^5$ and $R^7$ each represent, independently, an alkenyl group of 2 to 10 carbon atoms, and $R^6$ and $R^8$ each represent, independently, an alkenyl group of 3 to 10 carbon atoms); and a compound represented by said general formula (II-A), general formula (II-C), or general formula (II-D).

6. The nematic liquid crystal composition according to claim 2, comprising either one or at least two compounds selected from the group consisting of compounds represented by general formula (II-A-1) through general formula (II-A-8):

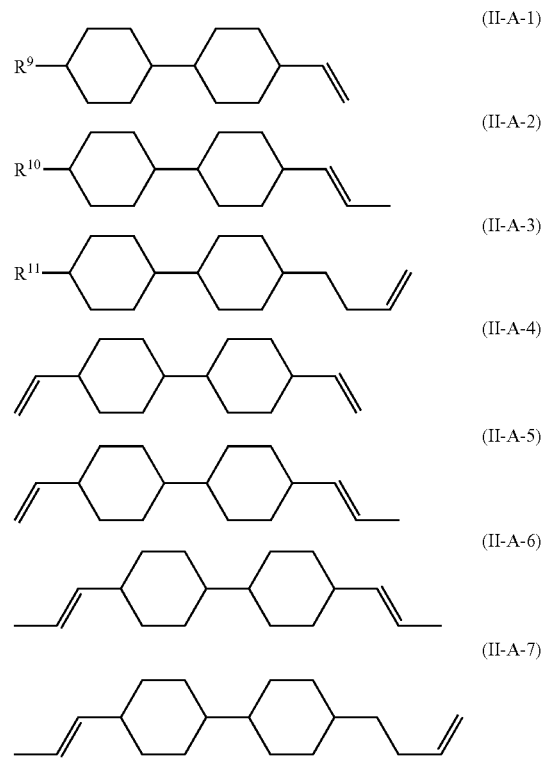

-continued (II-A-8)

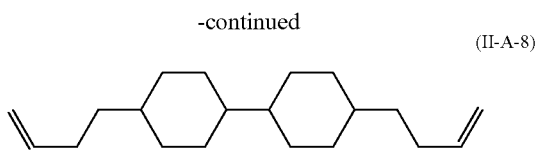

(wherein $R^9$, $R^{10}$, and $R^{11}$ each represent, independently, an alkyl group of 1 to 10 carbon atoms or an alkoxy group of 1 to 10 carbon atoms).

7. The nematic liquid crystal composition according to claim 2, comprising either one or at least two compounds selected from the group consisting of compounds represented by general formula (II-B-1) through general formula (II-B-7):

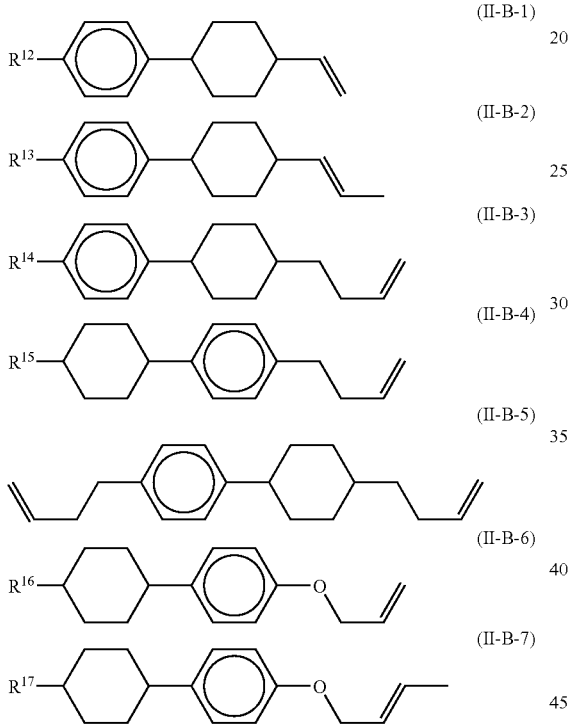

(II-B-1)
(II-B-2)
(II-B-3)
(II-B-4)
(II-B-5)
(II-B-6)
(II-B-7)

(wherein $R^{12}$, $R^{13}$, $R^{14}$, $R^{15}$, $R^{16}$, and $R^{17}$, each represent, independently, an alkyl group of 1 to 10 carbon atoms or an alkoxy group of 1 to 10 carbon atoms).

8. The nematic liquid crystal composition according to claim 2, comprising either one or at least two compounds selected from the group consisting of compounds represented by general formula (II-C-1) through general formula (II-C-6):

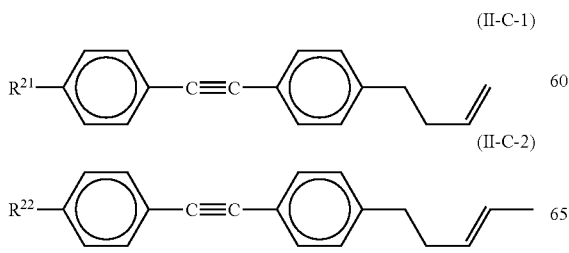

(II-C-1)
(II-C-2)
(II-C-3)
(II-C-4)
(II-C-5)
(II-C-6)

(wherein $R^{21}$ and $R^{22}$ each represent, independently, an alkyl group of 1 to 10 carbon atoms or an alkoxy group of 1 to 10 carbon atoms).

9. The nematic liquid crystal composition according to claim 2, comprising either one or at least two compounds selected from the group consisting of compounds represented by general formula (II-D-1) through general formula (II-D-5):

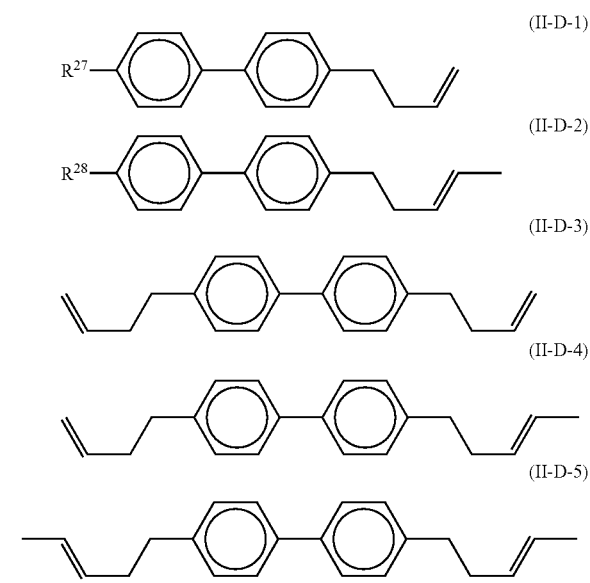

(II-D-1)
(II-D-2)
(II-D-3)
(II-D-4)
(II-D-5)

(wherein $R^{27}$ and $R^{28}$ each represent, independently, an alkyl group of 1 to 10 carbon atoms or an alkoxy group of 1 to 10 carbon atoms).

10. The nematic liquid crystal composition according to claim 6, comprising:
   either one or at least two compounds selected from the group consisting of compounds represented by said general formula (I-A) and general formula (I-B); and
   a compound represented by said general formula (II-A-1), general formula (II-A-2), or general formula (II-A-3).

11. The nematic liquid crystal composition according to claim 8, comprising:

either one or at least two compounds selected from the group consisting of compounds represented by said general formula (I-A) and general formula (I-B); and a compound represented by said general formula (II-C-1), general formula (II-C-2), or general formula (II-C-4).

12. The nematic liquid crystal composition according to claim 1, further comprising either one or at least two compounds selected from the group consisting of compounds represented by general formula (III-A) through general formula (III-J):

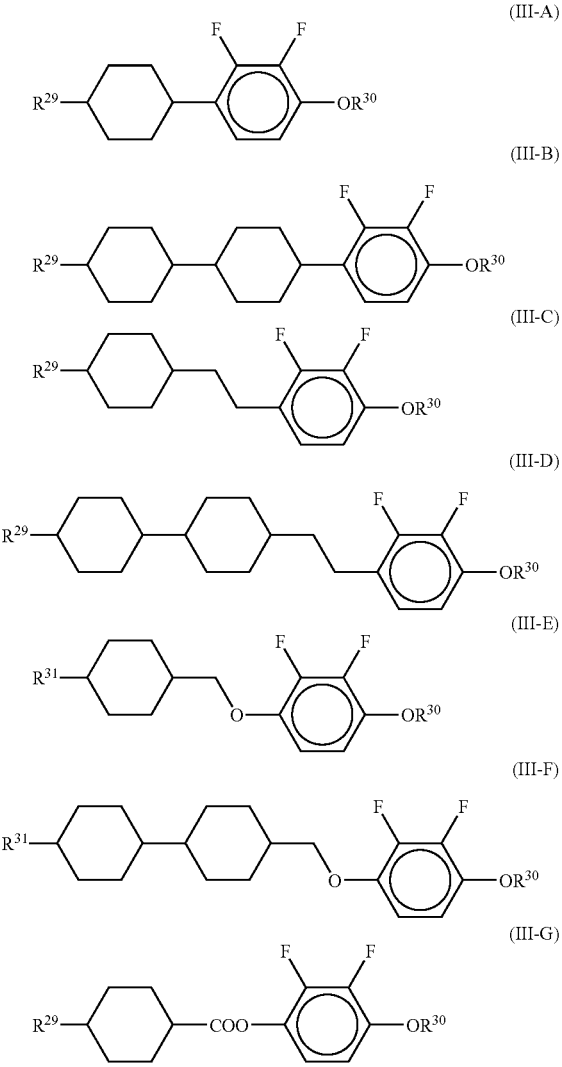

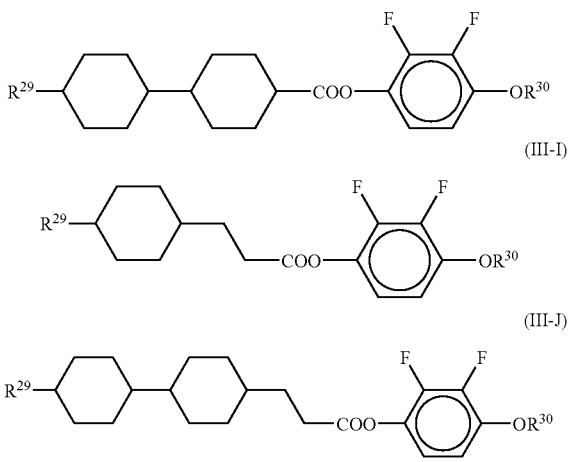

(wherein $R^{29}$ and $R^{30}$ each represent, independently, an alkyl group of 1 to 10 carbon atoms or an alkenyl group of 2 to 10 carbon atoms, in which one $CH_2$ group, or at least two $CH_2$ groups that are not adjacent, may be substituted with O and/or S, and one or at least two hydrogen atoms may be substituted with F or Cl; and $R^{31}$ represents an alkyl group of 1 to 10 carbon atoms, in which one $CH_2$ group, or at least two $CH_2$ groups that are not adjacent, may be substituted with O and/or S, and one or at least two hydrogen atoms may be substituted with F or Cl).

13. The nematic liquid crystal composition according to claim 1, wherein a dielectric constant anisotropy $\Delta\in$ at 25° C. is within a range of −2.0 to −8.0, a refractive index anisotropy Δn at 25° C. is within a range of 0.06 to 0.16, a viscosity at 20° C. is within a range of 10 mPa·s to 30 mPa·s, and a nematic phase-isotropic liquid phase transition temperature Tni is within a range of 70° C. to 130° C.

14. A liquid crystal display element, which uses a nematic liquid crystal composition according to claim 1.

15. A liquid crystal display element for active matrix driving, which uses a nematic liquid crystal composition according to claim 1.

16. A liquid crystal display element for VA mode, IPS mode, or ECB mode, which uses a nematic liquid crystal composition according to claim 1.

* * * * *